(12) United States Patent
Achiwa

(10) Patent No.: US 7,055,057 B2
(45) Date of Patent: May 30, 2006

(54) COHERENCY OF NON-COMMITTED REPLICATE DATA AFTER FAILOVER/FAILBACK

(75) Inventor: Kyosuke Achiwa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 251 days.

(21) Appl. No.: 10/797,052

(22) Filed: Mar. 11, 2004

(65) Prior Publication Data
US 2005/0154937 A1 Jul. 14, 2005

(30) Foreign Application Priority Data
Dec. 2, 2003 (JP) ............................. 2003-402994

(51) Int. Cl.
*G06F 11/00* (2006.01)
(52) U.S. Cl. ................. 714/6; 714/5; 714/13; 711/162
(58) Field of Classification Search .................... 714/5, 714/6, 13
See application file for complete search history.

(56) References Cited

U.S. PATENT DOCUMENTS

| | | | |
|---|---|---|---|
| 5,051,887 A | 9/1991 | Berger et al. | |
| 5,592,618 A | 1/1997 | Micka et al. | |
| 5,615,329 A * | 3/1997 | Kern et al. | 714/6 |
| 5,928,367 A * | 7/1999 | Nelson et al. | 714/6 |
| 6,052,797 A * | 4/2000 | Ofek et al. | 714/6 |
| 6,549,921 B1 * | 4/2003 | Ofek | 707/204 |
| 6,591,351 B1 | 7/2003 | Urabe et al. | 711/162 |
| 6,618,794 B1 | 9/2003 | Sicola et al. | |
| 6,671,705 B1 | 12/2003 | Duprey et al. | |
| 6,681,339 B1 * | 1/2004 | McKean et al. | 714/5 |
| 6,691,245 B1 * | 2/2004 | DeKoning | 714/6 |
| 6,694,447 B1 * | 2/2004 | Leach et al. | 714/6 |
| 6,728,898 B1 * | 4/2004 | Tremblay et al. | 714/6 |
| 6,816,951 B1 * | 11/2004 | Kimura et al. | 711/162 |
| 6,862,671 B1 * | 3/2005 | Bergsten | 711/162 |
| 2001/0008008 A1 | 7/2001 | Mori | |
| 2001/0049749 A1 | 12/2001 | Katsuragi et al. | 709/248 |
| 2003/0051111 A1 | 3/2003 | Nakano et al. | 711/162 |
| 2003/0145179 A1 | 7/2003 | Gabber et al. | |
| 2003/0182525 A1 | 9/2003 | O'Connell et al. | |
| 2004/0128442 A1 | 7/2004 | Hinshaw et al. | |
| 2004/0193952 A1 * | 9/2004 | Narayanan et al. | 714/13 |
| 2005/0071708 A1 * | 3/2005 | Bartfai et al. | 714/5 |

* cited by examiner

*Primary Examiner*—Robert Beausoliel
*Assistant Examiner*—Christopher McCarthy
(74) *Attorney, Agent, or Firm*—Mattingly, Stanger, Malur & Brundidge, P.C.

(57) ABSTRACT

When notice of a failover is received from a second information processing device during execution of remote copying, a second storage device requests from a first storage device first information indicating that a replication of the data written in a first storage area has not yet been transmitted to the second storage device, and that the replication of the data has not been written to a second storage area. When the first information is received from the first storage device as per the request, the second information processing device is notified that a data input/output request can be received; and, when a data read request transmitted from the second information processing device that performed failover is received, it is determined, by referring the first information, whether the target data of the data read request is stored in the first storage area.

20 Claims, 13 Drawing Sheets

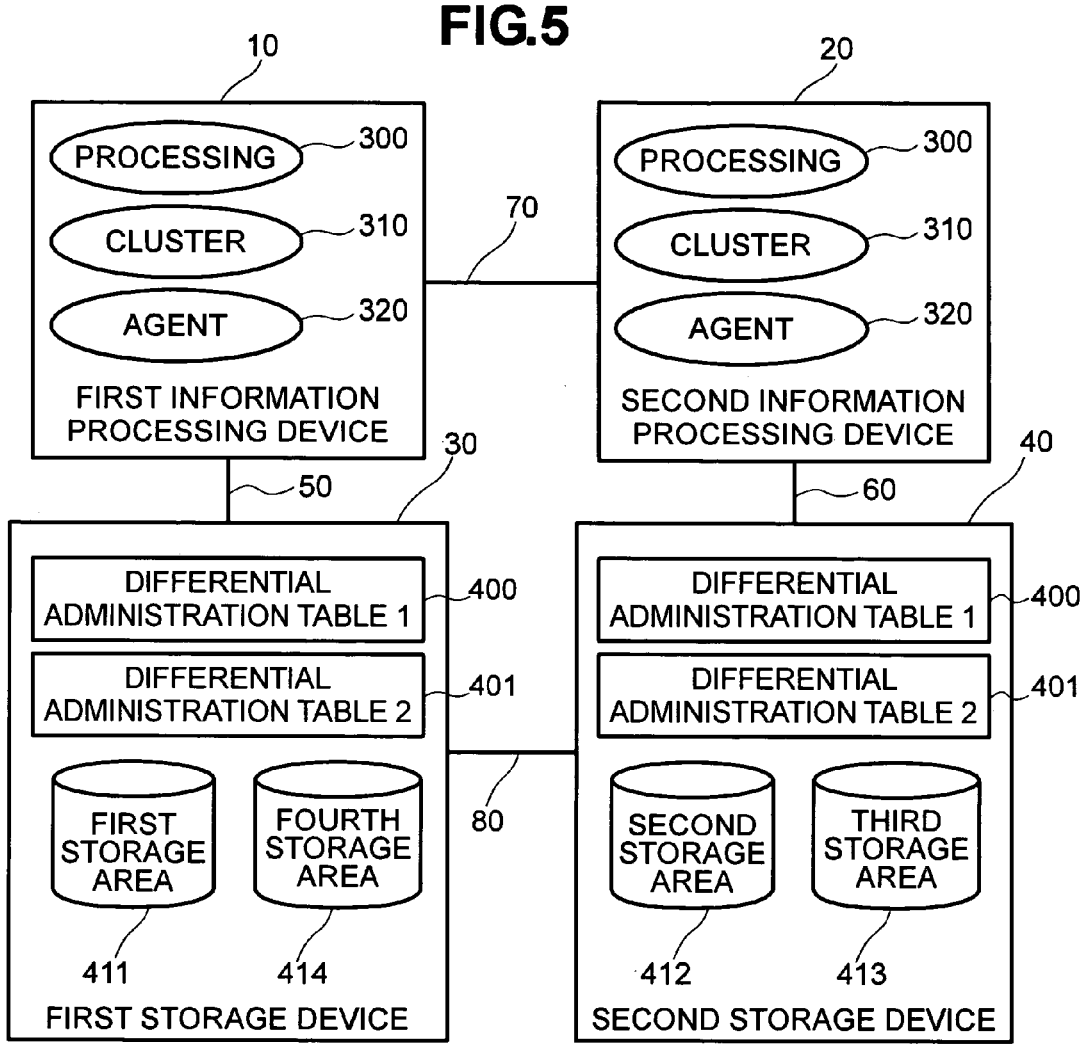

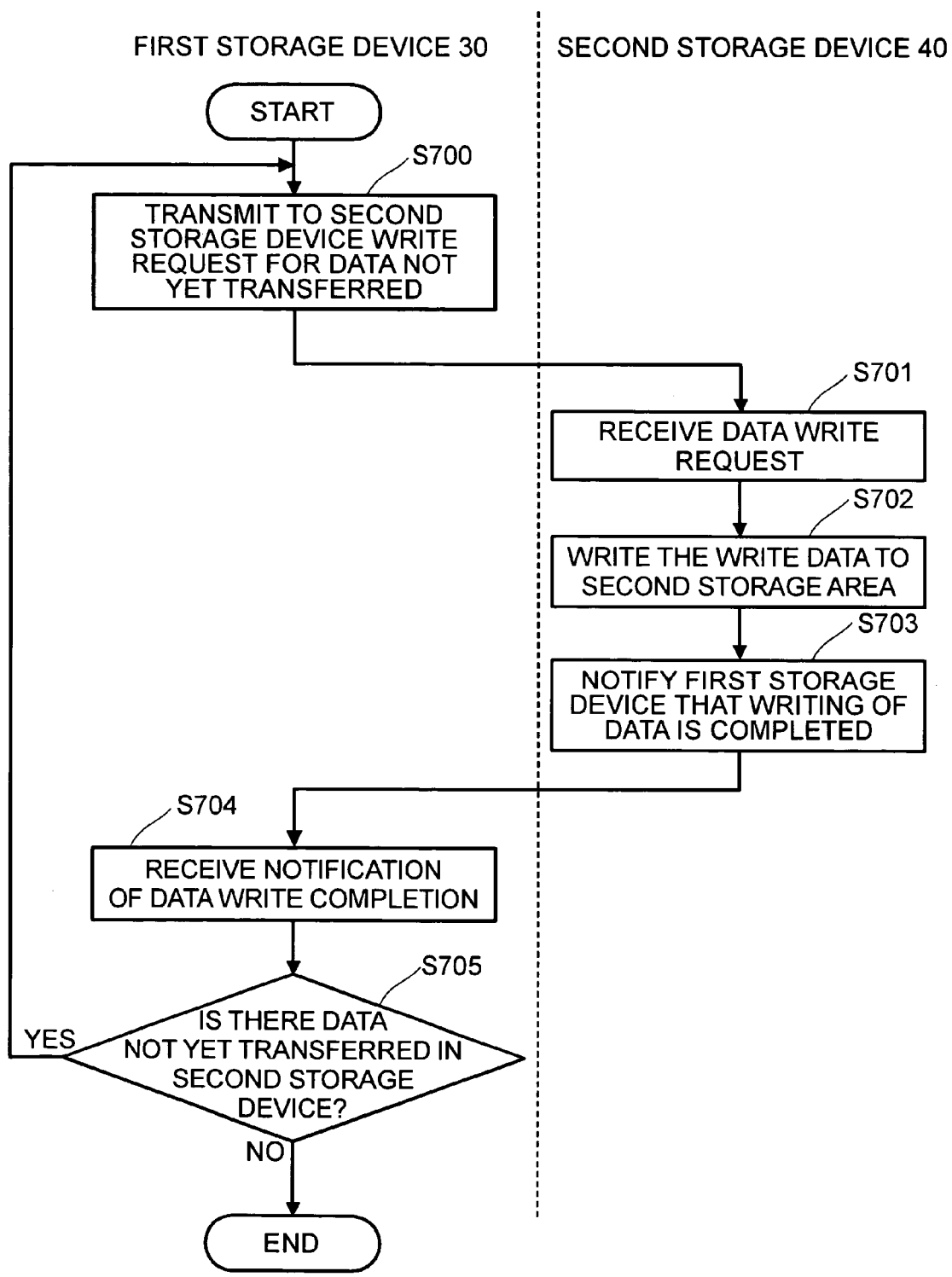

FIG.14

DATA LOCATION
DETERMINATION TABLE 500,600

| | |
|---|---|
| 0 | -1 |
| 1 | -2 |
| ⋮ | ⋮ |
| n | -1 |
| ⋮ | ⋮ |

NORMAL VOLUME BLOCK NUMBER

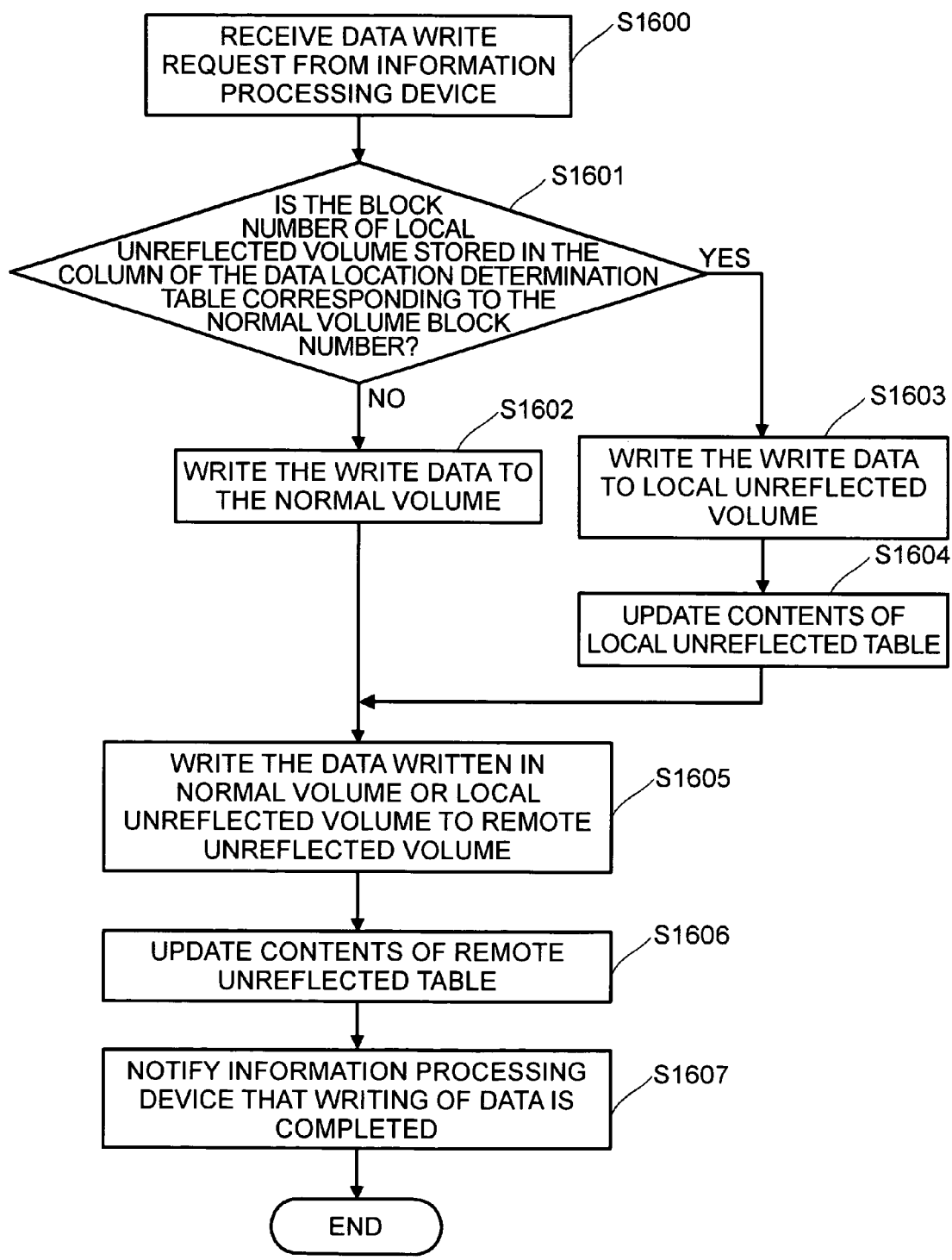

COHERENCY OF NON-COMMITTED REPLICATE DATA AFTER FAILOVER/FAILBACK

BACKGROUND OF THE INVENTION

The present invention relates to a control method for a storage system, to a storage system, and to a storage device.

Disaster recovery in storage systems is receiving widespread attention. Known techniques for performing disaster recovery include techniques for administrating the replication of data, which is stored in a replication source storage area in a replication destination storage area, as well (remote copying) (for example, see Japanese Patent Application Laid-open No. 2001-337939, U.S. Patent Application No. 2003/51111, and U.S. Pat. No. 6,591,351). By using this technique, when an information processing device which accesses the replication source storage device fails, the processing that was being performed on the information processing device can be taken over by another information processing device, which accesses the replicated data in the replication destination storage device.

However, copying of the data for replication from the replication source storage device to the replication destination storage device is sometimes not completed by the time the aforementioned takeover occurs. In this case, the information processing device for accessing the replication destination storage device is queued until the aforementioned copying is completed, and, in some cases, timeout and other problems occur in the information processing device, and the takeover sometimes fails.

An object of the present invention is to provide a control method for a storage system, a storage system, and a storage device capable of performing smooth takeover of processing between information processing devices.

SUMMARY OF THE INVENTION

The control method of the present invention for overcoming the foregoing drawbacks is employed in a storage system which consists of a first information processing device; a second information processing device which is connected to the first information processing device so as to be capable of communicating with the first information processing device, and which constitutes a cluster with the first information processing device; a first storage device which is connected to the first information processing device so as to be capable of communicating with the first information processing device, and which performs writing/reading of data to a first storage area in the first storage device according to a data input/output request transmitted from the first information processing device; and a second storage device which is connected to the second information processing device so as to be capable of communicating with the second information processing device, and which performs writing/reading of data to a second storage area in the second storage device according to a data input/output request transmitted from the second information processing device. The first storage device and the second storage device are connected to each other so as to be capable of communicating with each other; the second storage device, during a first processing in which the first storage device transmits to the second storage device a replication of the data written to the first storage area, and the second storage device that received the data writes the data to the second storage area, requests first information from the first storage device indicating which data written in the first storage area has not yet been transmitted to the second storage device and, therefore, has not been written to the second storage area, when a failover notice is received from the second information processing device; the second storage device notifies the second information processing device that a data input/output request can be received when the first information is received from the first storage device; and the second storage device refers to the first information upon receipt of a data read request transmitted from the second information processing device in which failover has occurred, requests the target data of the data read request to the first storage device if it s concluded that the target data of the data read request is not stored in the second storage area, and transmits to the second information processing device the target data of the data read request transmitted from the first storage device as per the request.

The problems disclosed in the present application and the method of overcoming these problems will be described in greater detail in the following specification.

The present invention provides a control method for a storage system, a storage system, and a storage device capable of performing smooth takeover of processing between information processing devices.

BRIEF DESCRIPTION OF THE DRAWINGS

FIG. 5 is a diagram outlining the structure of the storage system 90 according to an embodiment of the present invention;

FIG. 6 is a diagram depicting an example of the differential administration tables 1 and 2 (400 and 401) pertaining to the present invention;

FIG. 7 is a flowchart illustrating the processing relating to remote copying from the first storage device 30 to the second storage device 40 pertaining to the present invention;

FIG. 14 is a diagram depicting an example of the data location determination tables 500 and 600 pertaining to embodiment of FIG. 11;

FIG. 16 is a flowchart depicting an example of processing performed in a case in which the second storage device 40 receives a data write request from the second information processing device 20 after failover or failback in accordance with another embodiment.

DESCRIPTION OF THE PREFERRED EMBODIMENTS

Figure 1:
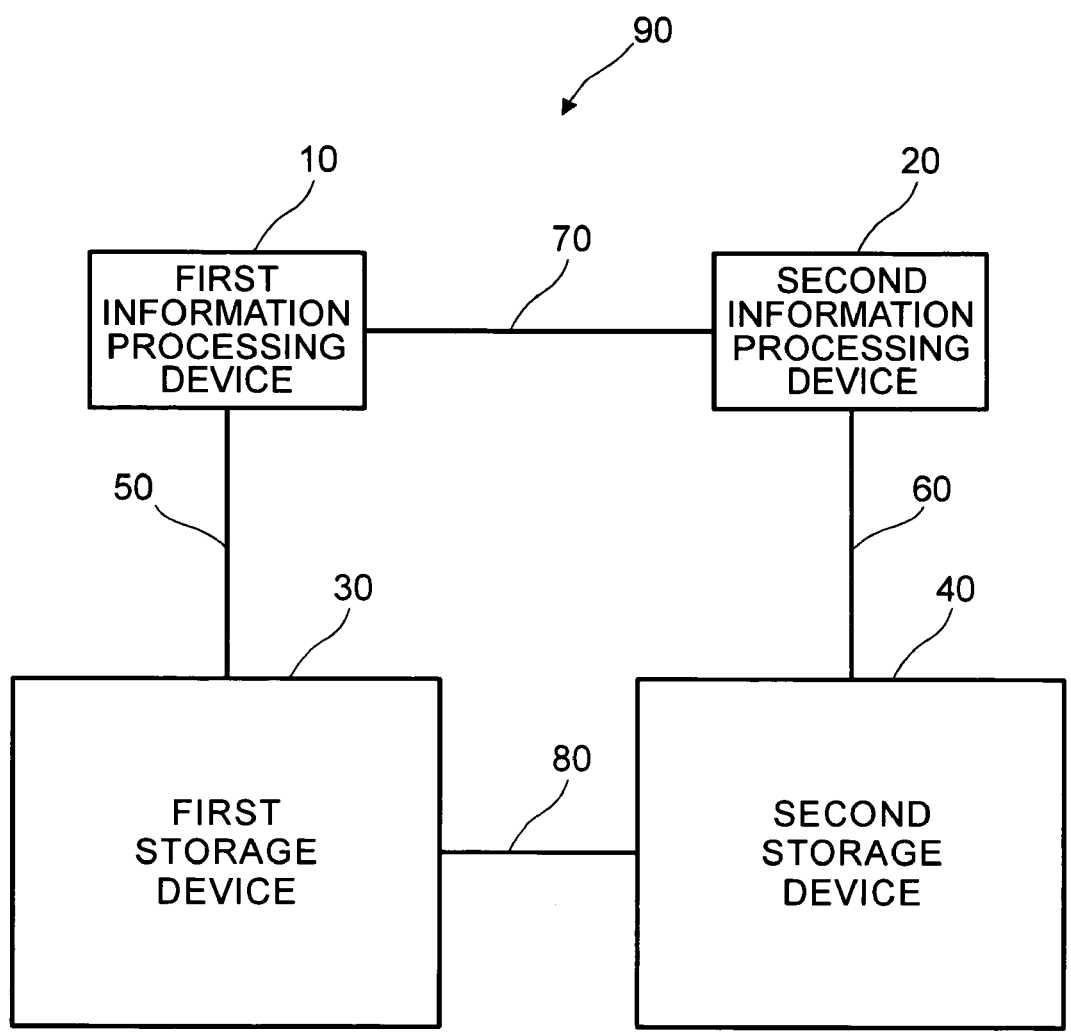
FIG. 1 is a block diagram depicting the overall structure of the storage system 90 pertaining to the present invention.

FIG. 1 is a block diagram depicting the overall structure of the storage system 90 representing an embodiment of the present invention.

The storage system 90 is made up of a first information processing device 10, a second information processing device 20 connected so as to be capable of communicating therewith, a first storage device 30 connected so as to be capable of communicating with the first information processing device 10, and a second storage device 40 connected so as to be capable of communicating with the second information processing device 20. The storage system 90 consists, for example, of an online system for a bank, accounting firm, or other business, an inventory management system in a commercial firm, a distributing company, or the like, or a system used regularly for seating reservations in a railroad or airline company. This storage system 90 is constructed for performing disaster recovery in the event of an earthquake, fire, typhoon, lightning strike, terrorist attack, or the like.

The first storage device 30 is connected so as to be capable of communicating with the second storage device 40 via a first network 80. The first network 80 consists, for example, of a Gigabit Internet (registered trademark), ATM (Asynchronous Transfer Mode), public circuit, or the like.

The information processing devices 10 and 20 are connected so as to be capable of communicating with the storage devices 30 and 40, respectively, via second networks 50 and 60. The second networks 50 and 60 each consist, for example, of a SAN (Storage Area Network). Each SAN consists of a network for exchanging data between the information processing device 10 (or 20) and the storage device 30 (or 40) in the form of "block" units. The storage devices 30 and 40 are block devices, and they store data in the form of block units. Also, each of the second networks 50 and 60 may consist of a LAN (Local Area Network), iSCSI (Internet Small Computer System Interface), Fibre Channel, ESCON (Enterprise Systems Connection) (registered trademark), FICON (Fiber Connection) (registered trademark), or the like.

The information processing devices 10 and 20 are connected so as to be capable of communicating via a third network 70. The third network 70 consists, for example, of a LAN (Local Area Network).

Figure 2:
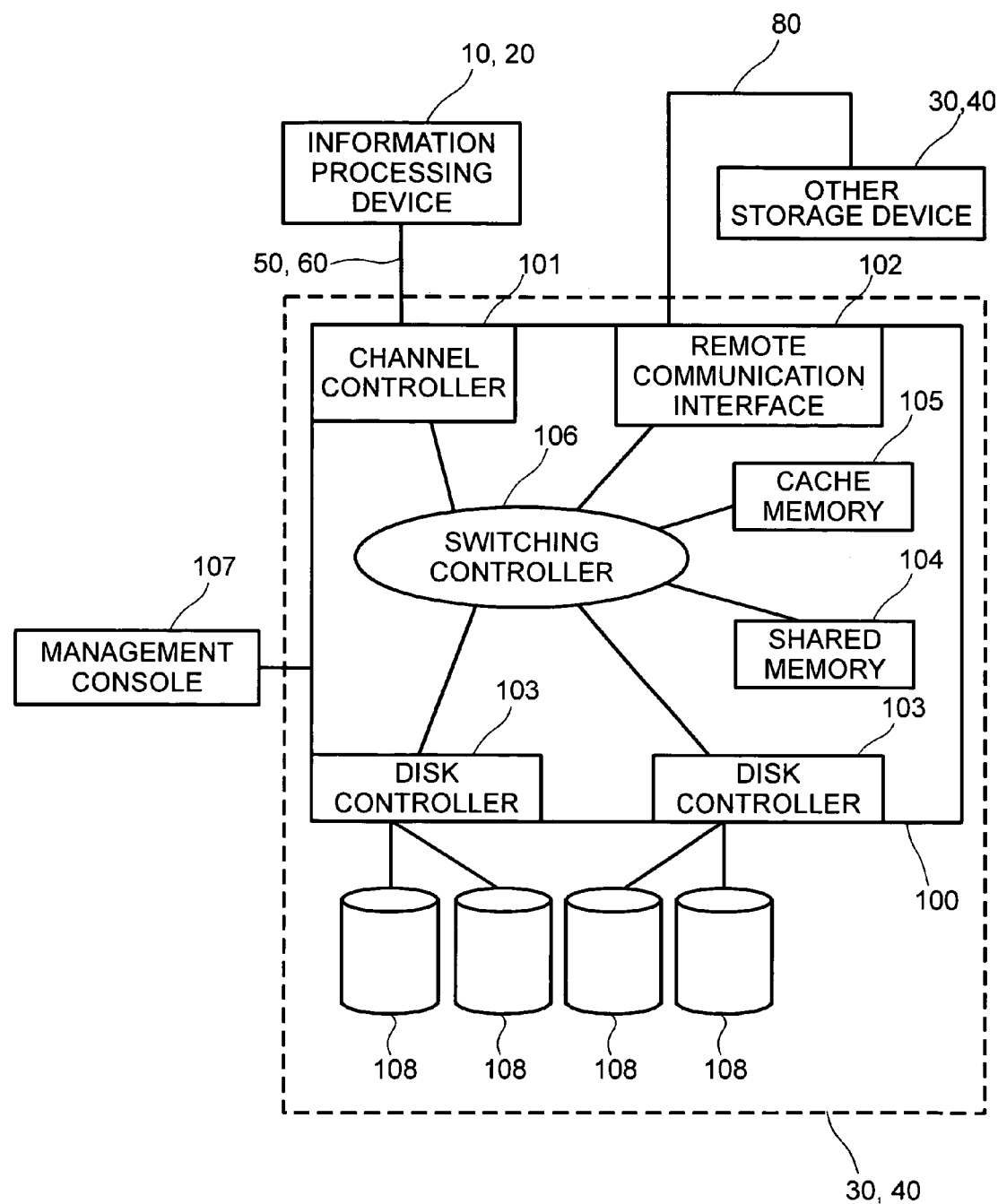
FIG. 2 is a block diagram depicting the specific structure of a disk array device presented as an example of the storage devices 30 and 40 of the storage systems of the present invention.

FIG. 2 depicts the specific structure of a disk array device presented as an example of the storage devices 30 and 40. Also, the storage devices 30 and 40 may consist, for example, of semiconductor storage devices or the like, instead of a disk array devices.

The disk array device comprises a storage control device 100 and disk drives 108. The storage control device 100 comprises a channel controller 101, remote communication interface 102, disk controllers 103, shared memory 104, cache memory 105, and a switching controller 106 or the like made up of a crossbar switch connected so as to be capable of communicating with the aforementioned components.

The cache memory 105 is mainly used for temporarily storing data exchanged between the channel controller 101 and disk controller 103.

The disk controller 103 reads a data input/output request written in the shared memory 104 by the channel controller 101 and executes processing for writing, reading, and the like of data to and from the disk drives 108 according to a command specified by the data input/output request (for example, a SCSI (Small Computer System Interface) specification command). The disk controller 103 may also be provided with RAID (Redundant Arrays of Inexpensive Disks) functionality. In such a case, it distributes data among the disk drives 108 according to the RAID level (0, 1, or 5, for example).

The disk drives 108 may, for example, be hard disk devices. The disk drives 108 may be integrated into a disk array device or may exist separately. The data storage area provided by the disk drives 108 is administrated in units of physical volumes or logical volumes that are logically set up on the physical volumes. Data can be read or written from or to the disk drives 108 by specifying an identifier of the logical volume and the location in it.

The management console 107 is a computer for maintaining/administering the disk array device or disk drives 108. For example, changing the software executed in the channel controller 101 or disk controller 103 and/or its parameters, configuring the disk drives 108, administration or setting of logical volumes (capacity administration or capacity expansion/reduction, provisioning of them to information processing devices 10 and 20, and the like), and other operations are performed according to instructions from the management console 107. The management console 107 can be housed in the disk array device, or it can exist separately.

The remote communication interface 102 is a communication interface (channel extender) for transferring data to the other storage devices 30 and 40, and the transfer of replication data for the remote copying to be described hereinafter is performed via the remote communication interface 102. The remote communication interface 102 converts the interface of the channel controller 101 (for example, Fibre Channel, ESCON (registered trademark), FICON (registered trademark), or other interface) to the communication format of the first network 80. Data is thereby transferred to the other storage devices 30 and 40.

Also, the disk array device may function as NAS (Network Attached Storage) device or the like configured to receive a data input/output request specifying a file name from the information processing devices 10 and 20 by means of NFS (Network File System) or other protocol, instead of the configuration described above, for example.

The shared memory 104 can be accessed from both the channel controller 101 and the disk controller 103. Other than being used for exchanging data input/output request commands, the memory is also used to store administration information for the storage devices 30 and 40 or disk drives 108.

Figure 3:
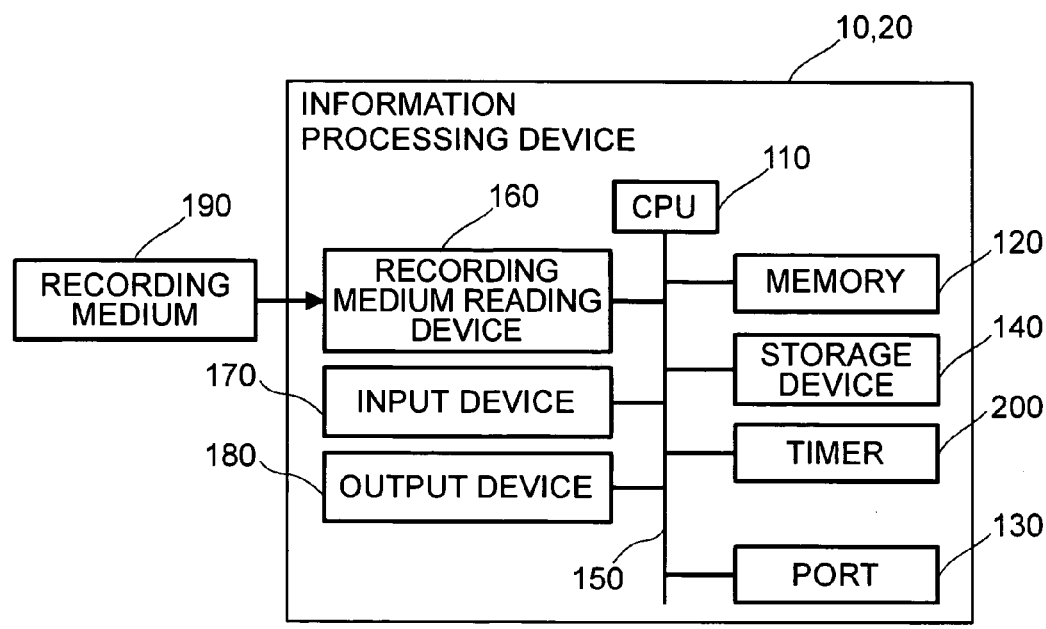
FIG. 3 is a block diagram depicting an example of the structure of the information processing devices 10 and 20 of the storage system of the present invention.

FIG. 3 is a block diagram depicting an example of the structure of the information processing devices 10 and 20 pertaining to the present embodiment.

The information processing devices 10 and 20 are provided with a CPU (processor) 110, memory 120, port 130, storage device 140, storage medium reading device 160, input device 170, output device 180, timer 200, and the like.

The CPU 110 administers control of the information processing devices 10 and 20 as a whole, performs various functions by executing programs stored in the memory 120, and performs processing of the information processing devices 10 and 20 to be described hereinafter. These functions consist, for example, of operating an automatic teller system for a bank, operating a system for reserving airline seating, or the like.

The storage medium reading device 160 consists of a device for reading programs or data stored in the storage medium 190. The programs or data thus read are stored in the memory 120 and/or storage device 140. A flexible disk, CD-ROM, semiconductor memory, or the like may be used as the storage medium 190. The storage medium reading device 160 may be housed in the information processing devices 10 and 20, or it may be external.

An operator or the like uses the input device 170 to input data and the like to the information processing devices 10 and 20. The input device 170 consists, for example, of a keyboard, mouse, or the like. The output device 180 is a device for outputting information to the outside. The output device 180 consists, for example, of a display, a printer, or the like. The port 130 is a device for performing communication with the storage devices 30 and 40. This port may also be used for performing communication between other information processing devices 10 and 20. In this case, the port 130 has a NIC (Network Interface Card) and an FC HBA (Fibre Channel Host Bus Adapter), for example. Consequently, the information processing devices 10 and 20 can be configured so as to receive programs or data stored in the memory 120 or storage device 140 of other information processing devices 10 and 20 via the port 130, and to store them in its own memory 120 or storage device 140.

The timer 200 monitors the time for performing a number of functions in the present embodiment. The timer 200 consists, for example, of a hardware timer, software timer, or the like. By means of this timer 200, it becomes possible for the information processing devices 10 and 20 to determine that a timeout error has occurred when data processing or a data transfer has not been completed within a pre-set time period, and to abort the processing or communication and to execute recovery processing. Consequently, a system down condition occurring as a result of leaving a timeout unnoticed can be prevented. These structures are interconnected by means of a bus 150.

Figure 4:
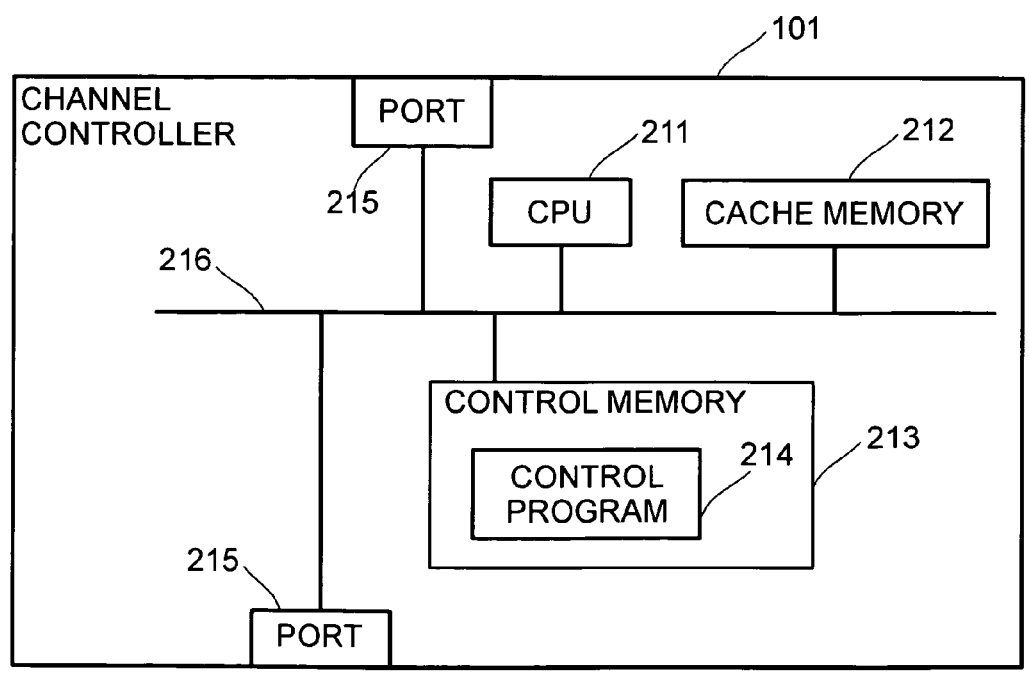
FIG. 4 is a block diagram depicting an example of the structure of the channel controller 101 pertaining to the present invention.

FIG. 4 is a block diagram depicting an example of the structure of the channel controller 101 pertaining to the present embodiment.

The channel controller 101 comprises a CPU 211, cache memory 212, control memory 213, ports 215, bus 216, and the like.

The CPU 211 administers control of the channel controller 101 as a whole, and it performs the processing of the channel controller 101 described hereinafter by executing a program stored in the control memory 213. A control program (replication processing function) 214 stored in the control memory 213 executes remote copying described hereinafter when executed by the CPU 211 of the storage devices 30 and 40. The cache memory 212 consists of a memory for temporarily storing data, commands, or the like that have been exchanged with the information processing devices 10 and 20. The port 215 consists of a communication interface for performing communication with the information processing devices 10 and 20. These structures are interconnected by means of the bus 216.

FIG. 5 is a diagram outlining the structure of a storage system representing an embodiment of the present invention.

Hardware, software, or the like for operating a cluster 310 is introduced into the first information processing device 10 and second information processing device 20 for the purpose of creating high availability. The cluster in the present embodiment mainly consists of a failover-type cluster. Configuring a failover-type cluster entails configuring two or more information processing devices to operate one at a time using one information processing device as the main (primary) device and the other information processing device as an auxiliary (secondary) device, such that when a failure occurs in the main information processing device for whatever reason, the other information processing device takes over the processing that was being performed by the main information processing device. By means of this cluster 310 of the information processing devices 10 and 20, it becomes possible for the information processing devices 10 and 20 to monitor each other to detect failure in the other information processing devices 10 and 20 via the third network 70. The cluster 310 of the information processing devices 10 and 20 also allows the information processing devices 10 and 20 to take over (failover) the processing 300 that was being performed by other information processing devices 10 and 20 when a failure is detected in the other information processing devices 10 and 20. Also, the cluster 310 of the information processing devices 10 and 20 allows the first information processing device 10 to take over (failback) the processing 300 that was being performed by the second information processing device 20 when it is concluded that a failure of the first information processing device 10 has been recovered. Other than detecting recovery and performing failback automatically, as described above, failback can also be set to occur in cases in which the first information processing device 10 detects a failure in the second information processing device 20, in cases in which there is a failback request by the system administrator via the input device 170, and in other cases.

The information processing devices 10 and 20 are capable of transmitting a data read request or data write request to the storage devices 30 and 40 respectively, and they are capable of receiving a notice that the reading or writing of data from or to the storage devices 30 and 40 has been completed.

The first storage device 30 comprises a differential administration table 1 (400), a first storage area 411, and the like. The second storage device comprises a second storage area 412 and the like.

The differential administration table 1 (400) consists of information for indicating that a replication of the data written in the first storage area 411 has not yet been transmitted to the second storage device 40, and, therefore, that the replication of the data has not been written to the second storage area 412. Also, the differential administration table 1 (400) of the second storage device 40 is a copy of differential administration table 1 (400) in the first storage device 30 transmitted from the first storage device 30 during failover. The differential administration table 2 (401) consists of information for indicating that the data written in the second storage area 412 and third storage area 413 have not yet been transmitted to the first storage device 30, and, therefore, that the data has not been written to the first storage area 411. The differential administration table 2 (401) may be created in advance, for example, during the boot process of the second storage device 40, or it may be created during failover. Also, the differential administration table 2 (401) of the first storage device 30 is copied from that in the second storage device 40 during failback. By means of these differential administration tables 1 and 2 (400 and 401), the storage devices 30 and 40 can determine the presence of untransferred data to the other storage devices 30 and 40 when performing the remote copying described hereinafter. By means of the differential administration tables 1 and 2 (400 and 401), the channel controller 101 of the storage devices 30 and 40 can also keep track of which blocks of data reside in which storage device.

FIG. 6 depicts an example of the differential administration tables 1 and 2 (400 and 401). A "1" or "0" is recorded in the bit value column of the differential administration tables 1 and 2 (400 and 401). When a "1" is recorded, this indicates that this block contains data that has not yet been transferred to the other storage devices 30 and 40. Alternatively, when a "0" is recorded, this indicates that the data in this block has been transferred to the other storage devices 30 and 40. Also, all the entries of each of the differential administration tables 1 or 2 (400 or 401) are initialized as '0' when they are created. In the present embodiment, the differential administration tables 1 and 2 (400 and 401) are stored in the shared memory 104, but they may also be stored in storage areas 411 through 414, or in another location.

The first storage area 411 stores the data written by the first information processing device 10 or received from second storage device 40. The fourth storage area 414 consists of an auxiliary storage area. The second storage area 412 stores the data written by the second information processing device 20 or received from first storage device 30. The third storage area 413 consists of an auxiliary storage area. Also, in the present embodiment, storage areas 411 through 414 are all configured with the same capacity size, but they are not limited to this arrangement.

The processing performed in the storage devices 30 and 40, when the storage devices 30 and 40 receive a data input/output request from the information processing devices 10 and 20, will be described next. When a data write request transmitted from the information processing devices 10 and 20 is received, the channel controller 101 stores a command for a data write request (hereinafter referred to as "data write command") in the shared memory 104, and it stores the target data of this data write command (hereinafter referred to as "write data") in the cache memory 105. The disk controller 103 monitors the contents of the shared memory 104 in real time. When this monitoring detects that a data write command has been written to the shared memory 104, the disk controller 103 reads the write data from the cache memory 105 and writes the write data to the storage areas 411 through 414 based on an address (block number) specified by the data write command.

When writing of data to the storage areas 411 through 414 is completed, the disk controller 103 notifies the channel controller 101 of this completion. When notice of the data write completion is received, the channel controller 101 transmits a notice of data write completion to the information processing devices 10 and 20.

When the channel controller 101 receives the aforementioned notice from the disk controller 103, the channel controller 101 updates the bit value column of the differential administration table 1 (400) to "1" based on the block number to which the data has been written. An arrangement may also be adopted whereby the disk controller 103 updates the bit value column. The channel controller 101 then transmits a notice of data write completion to the information processing devices 10 and 20.

On the other hand, when a data read request transmitted from the information processing devices 10 and 20 is received, the channel controller 101 delivers a command for a data read request (hereinafter referred to as "data read command") to the disk controller 103. Also, the data read command can be transmitted from the channel controller 101 to the disk controller 103 via the shared memory 104.

When a data read command is received from the channel controller 101, the disk controller 103 reads the data to be read (hereinafter referred to as "read data") from the storage areas 411 through 414 based on an address specified by the data read command. The data thus read is then written to the cache memory 105. When the transfer of data to the cache memory 105 is completed, the disk controller 103 notifies the channel controller 101 of this completion. The channel controller 101 then transmits the read data stored in the cache memory 105 to the information processing devices 10 and 20.

Also, besides data being exchanged between the first information processing device 10 and first storage device 30 in the storage system 90 pertaining to the present embodiment as described above, processing for managing the replication (remote copying) of the data in the first storage device 30 to the second storage device 40 is also performed in the background. By this remote copying, the data contents in the storage areas 411 and 412 becomes identical, and thus redundant data management is achieved. Remote copying will be described hereinafter.

Remote Copying

FIG. 7 is a flowchart illustrating the processing relating to remote copying from the first storage device 30 (replication source storage device) to the second storage device 40 (replication destination storage device) pertaining to the present embodiment.

After transmitting a data write completion notice to the first information processing device 10, the channel controller 101 of the first storage device 30 refers to the differential administration table 1 (400) recorded in the shared memory 104 and transmits a write request for data not yet transferred to the second storage device 40 (S700). Also, the block number in the first storage area 411 in which the transmitted data is stored is set as the address specified by this data write command.

When the channel controller 101 of the second storage device 40 receives a data write command from the first storage device 30 (S701), the disk controller 103 writes the write data to the corresponding block in the second storage area 412 according to the data write command (S702). When writing of data to the second storage area 412 is completed, the channel controller 101 of the second storage device 40 transmits a notice of data write completion to the first storage device 30 (S703).

When the notice of data write completion is received (S704), the channel controller 101 of the first storage device 30, based on the block number specified by the data write request, updates the bit value in the differential administration table 1 (400) corresponding to that block from "1" to "0." Also, the updating may be performed by means of the disk controller 103.

The channel controller 101 of the first storage device 30 then refers to the updated differential administration table 1 (400) and determines whether or not there is data that has not yet been transmitted to the second storage device 40 (S705). When the channel controller 101 of the first storage device 30 concludes that there is data that has not yet been transmitted to the second storage device 40 (S705; YES), the process proceeds to step (S700). On the other hand, when the channel controller 101 of the first storage device 30 concludes that there is no data that has not yet been transmitted to the second storage device 40 (S705; NO), the process is terminated.

As described above, by means of processing whereby the first storage device 30 presents the second storage device 40 with a replication of the data stored in the first storage area 411 and the second storage device 40 that received the replication of the data in the second storage area 412 stores the replication (hereinafter referred to as "first processing"), it becomes possible that the contents of the first storage area 411 and second storage area 412 will be the same, and that data redundancy is achieved.

Also, when the first processing is completed after failover has been performed, processing is first performed whereby a replication of all of the data for which the corresponding bit of differential administration table 2 (401) is "1" and which was stored by the disk controller 103 of the second storage device 40 in the third storage area 413 is written to the second storage area 412. Processing similar to steps (S700) through (S705), as described above, is then performed. The difference is that the direction of data flow is reversed. Namely, data is transferred from the second storage device 40 to the first storage device 30. Therefore, in (S700), the channel controller 101 of the second storage device 40 refers to the differential administration table 2 (401) and transmits a write request for data not yet transmitted to the first storage device 30.

To determine when the first processing is finished, for example, the first storage device 30 adds to the write request a last data mark which indicates that there is no untransferred data remaining in the first storage device 30. When the second storage system 40 receives the last data mark, it clears all of the bits of the differential administration table 1 (400) to "0".

In a similar way, when the second processing is completed after failback is performed, a processing is performed whereby all of the data whose corresponding bits of differential administration table 3 (402) are "1" and which were stored in the fourth storage area 414 are copied to the first storage area 411. In this case, when each copy operation is performed, the corresponding bit of the differential administration table 3 (402) is reset to "0" and the corresponding bit of the differential administration table 1 (400) is set to "1". These bit operations are performed to make the copied data to the first storage area 411 the targets of remote copying. It is desirable to make sure that this kind of bit operation to the differential administration table is not performed when the first processing is completed after failover is performed.

In this manner, by means of processing whereby the second storage device 40 presents the first storage device with a replication of the data stored in the second storage area 412 and the third storage area 413, and the first storage device 30 that received the replication stores the replication (hereinafter referred to as "second processing"), it becomes possible that the contents of the first storage area 411 and second storage area 412 will be the same.

Also, when the second processing is completed after failback is performed, processing is first performed whereby a replication of all of the data stored by the disk controller 103 of the first storage device 30 in the fourth storage area 414 is written to the first storage area 411. Processing in accordance with steps (S700) through (S705) is then performed. Also, in (S700), the channel controller 101 of the first storage device 30 refers to the differential administration table 3 and transmits a write request for data not yet transmitted to the second storage device 40. The differential administration table 3 consists of information indicating that the data written in the first storage area 411 and the fourth storage area 414 has not yet been transmitted to the second storage device 40, and that the data has not been written in the second storage area 412. The differential administration table 3 may be created in advance during the boot process of the first storage device 30, or it may be created during failover after failback. The differential administration table 3 is transmitted from the first storage device 30 to the second storage device 40 during failover after failback. By means of this differential administration table 3, the second storage device 40 can determine whether or not data is present that has not yet been transferred to the first storage device 30 when remote copying is performed. By means of the differential administration table 3, the channel controller 101 of the second storage device 40 can also keep track of which blocks of data reside in which storage device. Also, the differential administration table 3 has the same format as the differential administration tables 1 and 2 (400 and 401).

In this manner, by utilizing processing in which the first storage device 30 presents the second storage device 40 with a replication of the data stored in the fourth storage area 414, and the second storage device 40 that has received the replication stores the replication in the second storage area 412 (hereinafter referred to as "third processing"), it becomes possible that the contents of the first storage area 411 and second storage area 412 will be the same.

Processing Performed when Failure Occurs in the First Information processing device An example of the processing that is performed when the second information processing device 20 detects failure of the first information processing device 10 will be described next with reference to FIG. 8.

When the second information processing device 20 detects failure of the first information processing device 10 (S800), the second information processing device 20 notifies the second storage device 40 that failover will be performed (S801).

When notice that failover will be performed is received from the second storage device 20 (S802), the channel controller 101 of the second storage device 40 requests the differential administration table 1 (400) from the first storage device 30 (S803).

The channel controller 101 of the first storage device 30 presents the second storage device 40 with a replication of the differential administration table 1 (400) as stored in the shared memory 104 (S805) upon receipt of a request for the differential administration table 1 (400) from the second storage device 40 (S804).

The channel controller 101 of the second storage device 40 stores the differential administration table 1 (400) in the shared memory 104 (S807) upon receipt of the differential administration table 1 (400) from the first storage device 30 (S806). The channel controller 101 of the second storage device 40 then notifies the second information processing device 20 that a data input/output request can be received (S808).

The second information processing device 20 takes over the processing being performed by the first information processing device 10 (performs failover) (S810), upon receipt of notification from the second storage device 40 that a data input/output request can be received (S809), and completes the processing. The second information processing device 20 then presents the second storage device 40 with a data input/output request issued from the failed-over processing, and the second storage device 40 processes the data according to the data input/output request transmitted from the second information processing device 20.

Also, in connection with the present embodiment, processing was described for a case in which the second information processing device 20 detects failure of the first information processing device 10, but processing similar to steps (S801) through (S810) is also performed in the case of failback. Also, notification that failback will be performed is made, for example, after failure of the first information processing device 10 has been recovered.

In the present embodiment, an arrangement is described in which the second storage device 40 receives the differential administration table 1 (400) from the first storage device 30 prior to failover, but the second storage device 40 may also receive the differential administration table 1 (400) from the first storage device 30 after failover.

In the present embodiment, the processing in steps (S803) through (S810) is performed when notice of failover is received, but the processing in steps (S803) through (S810) may also be performed in a case in which the first data input/output request is received from the information processing devices 10 and 20. In this case, notice of failover is not issued, but the second storage device 40 can determine that failover has been made by receiving an input/output request from the second information processing device 20.

The present embodiment is configured such that the second information processing device 20 monitors failure of the first information processing device 10, but the first storage device 30 may also monitor failure of the first information processing device 10. In this case, an arrangement may be adopted whereby the first storage device 30 transmits the differential administration table 1 (400) to the second storage device 40 when the first storage device 30 detects failure of the first information processing device 10, and the second storage device 40 can transmit a notice to the second information processing device 20 that a data input/output request can be received. By this means, the second information processing device 20 executes failover and is able to transmit a data input/output request to the second storage device 40.

In the present embodiment, the storage devices 30 and 40 receive the differential administration tables 1 and 2 (400 and 401) by requesting them from the other storage devices 30 and 40, but the differential administration tables 1 and 2 (400 and 401) may also be presented to the other storage devices 30 and 40 each time they are updated by the storage devices 30 and 40. Also, an arrangement may be adopted whereby the differential administration tables 1 and 2 (400 and 401), that are transmitted to the other storage devices 30 and 40 from the storage devices 30 and 40, are presented via the information processing devices 10 and 20. The storage devices 30 and 40 may also transmit information to the other storage devices 30 and 40, such as the address (block number) information specified in data write requests issued by the information processing devices 10 and 20, instead of by the aforementioned differential administration tables 1 and 2 (400 and 401).

By means of the mechanism described above, timeouts that occur due to the information processing devices 10 and 20 waiting for processing performed during failover or failback (processing for making the contents of the replication destination storage areas 411 (and 412) and the contents of the replication source storage areas 412 (and 411) the same) can be avoided, and takeover of processing between the information processing devices 10 and 20 can be performed smoothly. It also becomes possible to smoothly operate the storage system and to enhance the reliability and availability of the storage system.

Processing Performed when a Data Write Command is Received

Figure 9:
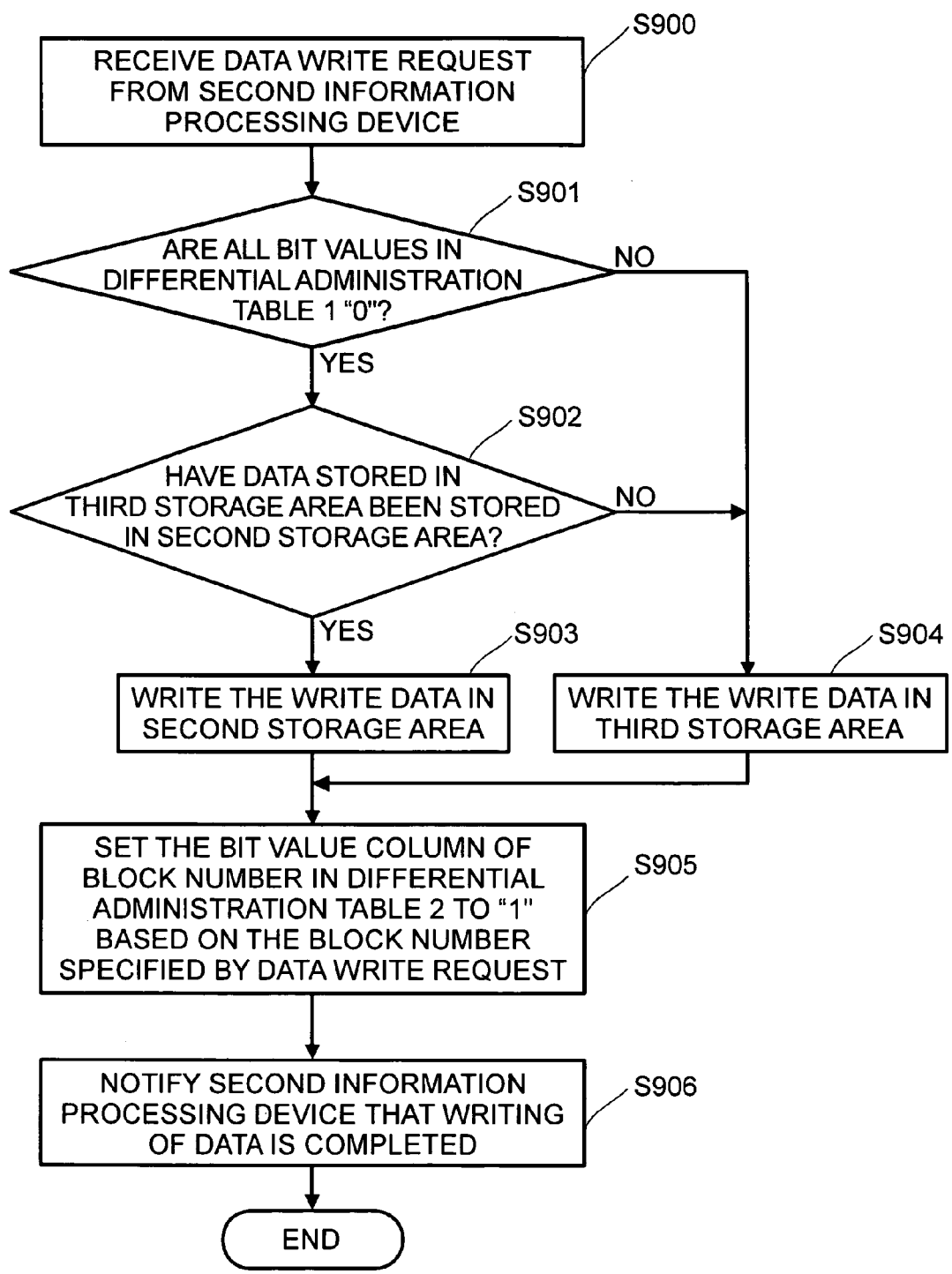
FIG. 9 is a flowchart depicting an example of the processing performed when the second storage device 40 receives a data write request from the second information processing device 20 after failover in accordance with the present invention.

An example of the processing performed when the second storage device 40 receives a data write request from the second information processing device 20 after failover will be described next with reference to FIG. 9.

When a data write request is received from the second information processing device 20 (S900), the channel controller 101 of the second storage device 40 refers to the differential administration table 1 (400) and determines whether or not the bit values in the differential administration table 1 (400) are all "0" (S901). When the channel controller 101 of the second storage device 40 concludes that the bit values in the differential administration table 1 (400) are not all "0" (S901; NO), the process proceeds to step (S904). Alternatively, when the channel controller 101 of the second storage device 40 concludes that the bit values in the differential administration table 1 (400) are all "0" (S901; YES), the process proceeds to step (S902).

In step (S902), the channel controller 101 of the second storage device 40 determines whether or not the data stored in the third storage area 413 is also stored in the second storage area 412 (S903). When the channel controller 101 of the second storage device 40 concludes that a replication of all the data stored in the third storage area 413 is not stored in the second storage area 412 (S902; NO), the process proceeds to step (S904). Alternatively, when the channel controller 101 of the second storage device 40 concludes that a replication of all the data stored in the third storage area 413 is stored in the second storage area 412 (S902; YES), the channel controller 101 of the second storage device 40 stores a data write command in the shared memory 104 and stores this write data in the cache memory 105. The disk controller 103 reads the write data from the cache memory 105 upon detecting that a data write command has been written to the shared memory 104 and writes the write data to the second storage area 412 based on the block number specified by the data write command (S903).

In step (S904), the disk controller 103 of the second storage device 40 writes the write data both to the third storage area 413 and to the second storage area 412 in the same manner as in step (S903).

When the writing of data to the storage areas 412 or 413 is completed (S903 and S904), the disk controller 103 of the second storage device 40 notifies the channel controller 101 of the second storage device 40 of this completion. When notice of data write completion is received, the channel controller 101 of the second storage device 40 updates the block number bit value column of the differential administration table 2 to "1" based on the block number specified by the data write request (S905). The channel controller 101 of the second storage device 40 then notifies the second information processing device 20 that writing of data is completed (S906), and processing is terminated.

Also, in the present embodiment, the target data of the data write command is stored in the third storage area 413 in step (S904), but an arrangement may be adopted whereby the channel controller 101 of the second storage device 40 transfers a data write request to the first storage device 30, and the channel controller 101 of the first storage device 30 stores the data in the first storage area 411 according to the aforementioned data write request. In this case, after data writing has been completed, the channel controller 101 of the first storage device 30 updates the bit value column of the differential administration table 1 (400) to "1" based on the block number specified by the data write request. When notice is received from the first storage device 30 that data writing has been completed, the channel controller 101 of the second storage device 40 also updates the bit value column of the differential administration table 1 (400) to "1" based on the block number specified by the data write request.

Also, as described above, when the first processing is completed, the disk controller 103 of the second storage device 40 stores a replication of the data stored in the third storage area 413 in the second storage area 412, and then initiates the second processing. By performing processing according to this sequence, the newest data can be secured in the second storage area 412, and the newest data can also be redundantly administrated in the first storage area 411 as well.

In connection with the present embodiment, processing after failover has been described, but processing is also performed in accordance with steps (S900) through (S906) after failback. In this case, the "third storage area 413" of step (S902) becomes the "fourth storage area 414," and the "differential administration table 2 (401)" of step (S905) becomes the "differential administration table 3." The differential administration table 3 consists of information indicating that a replication of the data written in the fourth storage area 414 has not yet been transmitted to the second storage device 40, and that a replication of the data has not been written to the second storage area 412. The differential administration table 3 is newly created during failback and is stored in the shared memory 104 by the channel controller 101 of the first storage device 30.

Processing is also performed in accordance with steps (S900) through (S906) in a case in which failback is performed during the first processing. In the background, as described above, after the first processing is completed, the disk controller 103 of the second storage device 40 stores in the second storage area 412 a replication of the data stored in the third storage area 413. Then the second processing is initiated. When it is completed, the disk controller 103 of the first storage device 30 stores in the first storage area 411 a replication of the data stored in the fourth storage area 414. The third processing is initiated thereafter. By processing according to this sequence, the newest data can be secured, and the newest data can also be redundantly administrated.

Processing Performed when a Data Read Request is Received

An example of processing performed when the second storage device 40 receives a data read request from the second information processing device 20 after failover will be described next with reference to FIG. 10.

When a data read request is received from the second information processing device 20 (S1000), the channel controller 101 of the second storage device 40 determines whether or not the data specified by the data read command is present in the third storage area 413 (S1001). This determination can be performed, for example, by referring to the differential administration table 1 (400) and the differential administration table 2 (401). When the channel controller 101 of the second storage device 40 concludes that the data specified by the data read command is present in the third storage area 413 (S1001; YES), the process proceeds to step (S1008). Alternatively, when the channel controller 101 of the second storage device 40 concludes that the data specified by the data write command is not present in the third storage area 413 (S1001; NO), the channel controller 101 of the second storage device 40 determines whether or not the data specified by the data read command is present in the second storage area 412 (S1002). This determination may be performed, for example, by referring to the differential administration table 1 (400). Also, performing a determination in accordance with the sequence described above enables the second storage device 40 to determine where the newest data is located.

In step (S1002), when the channel controller 101 of the second storage device 40 concludes that the data specified by the data read command is present in the second storage area 412 (S1002; YES), the process proceeds to step (S1009). Alternatively, when the channel controller 101 of the second storage device 40 concludes that the data specified by the data read command is not present in the second storage area 412 (S1002; NO), the channel controller 101 of the second storage device 40 presents the first storage device 30 with a data read request (S1003).

When a data read request is received from the second storage device 40 (S1004), the channel controller 101 of the first storage device 30 delivers a data read command to the disk controller 103. Upon receipt of the data read command from the channel controller 101, the disk controller 103 reads the read data from the first storage area 411 based on the block number specified by the data read command (S1005). This read data is then written to the cache memory 105. When data transfer to the cache memory 105 is completed, the disk controller 103 notifies the channel controller 101 of this completion. When the aforementioned notice is received from the disk controller 103, the channel controller 101 of the first storage device 30 transmits to the second storage device 40 the read data stored in the cache memory 105 (S1006).

When the read data is received from the first storage device 30 (S1007), the channel controller 101 of the second storage device 40 transmits the read data to the second information processing device 20 (S1010), and the process is terminated.

In step (S1008), when the disk controller 103 receives the data read command from the channel controller 101 of the second storage device 40, the disk controller 103 reads the read data from the third storage area 413 based on the block number specified by the data read command. The channel controller 101 of the second storage device 40 then transmits the read data to the second information processing device 20 (S1010), and the process is terminated.

In step (S1009), the disk controller 103 reads the read data from the second storage area 412 in the same manner as in step (S1008). The channel controller 101 of the second storage device 40 then transmits the read data to the second information processing device 20 (S1010), and the process is terminated.

In connection with the present embodiment, processing after failover has been described, but processing is also performed in accordance with steps (S1000) through (S1010) after failback. In this case, in step (S1001), the channel controller 101 of the first storage device 30 determines whether or not the data specified by the data read command is present in the fourth storage area 414. This determination may be performed, for example, by referring to the differential administration table 1 and the differential administration table 3. Also, in step (S1002), the channel controller 101 of the first storage device 30 determines whether or not the data specified by the data read command is present in the first storage area 411. This determination may be performed, for example, by referring to the differential administration table 1.

Also, when it is concluded that the data specified by the data read command is not present in the first storage area 411 (S1002; NO), the channel controller 101 of the first storage device 30 presents the second storage device 40 with a data read request (S1003). Alternatively, when it is concluded that the data specified by the data read command n is present in the third storage area 413 (S1002; YES), the channel controller 101 of the first storage device 30 reads the data from the first storage area 411 (S1009). Also, similar processing is performed in a case in which failback is performed during execution-of the first processing.

Performing a determination in accordance with the sequence described above enables the storage devices 30 and 40 to determine where the newest data is located. Also, processing in the manner described above enables the storage devices 30 and 40 to provide the newest data in response to a data read request transmitted from the information processing devices 10 and 20.

Other Embodiments

Figure 11:
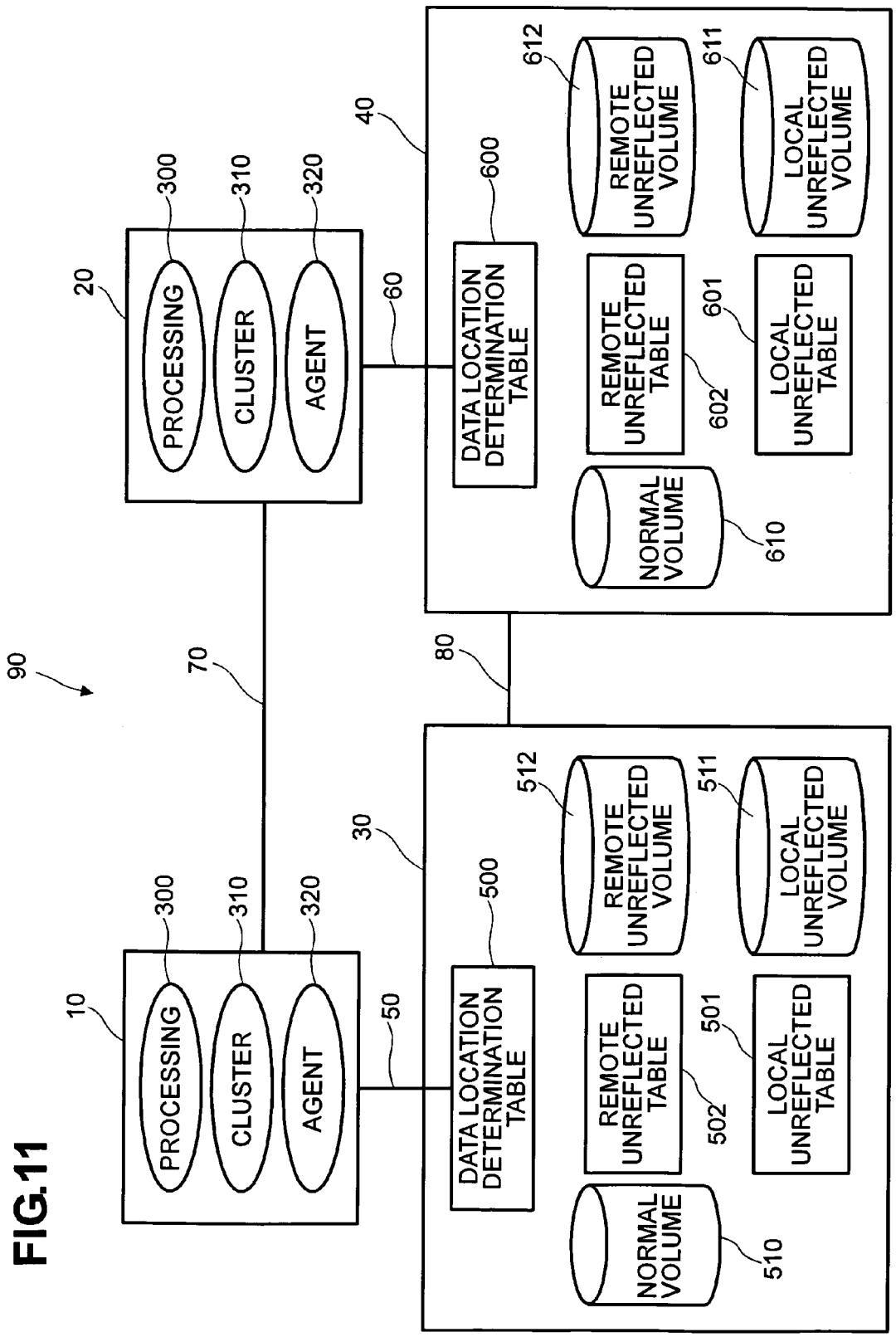
FIG. 11 is a block diagram outlining the structure of the storage system 90 representing an example of another embodiment of the present invention.

FIG. 11 is a diagram outlining the structure of the storage system 90 representing an example of another embodiment of the present invention.

The storage devices 30 and 40 are provided with data location determination tables 500 and 600, local unreflected tables 501 and 601, remote unreflected tables 502 and 602, normal volumes 510 and 610, local unreflected volumes 511 and 611, remote unreflected volumes 512 and 612, and the like.

The normal volumes 510 and 610 consist of storage areas for writing the write data transmitted from the storage devices 30 and 40 or information processing devices 10 and 20. The local unreflected volumes 511 and 611 consist of auxiliary storage areas. When write data transmitted from the information processing devices 10 and 20 is written to the local unreflected volumes 511 and 611, the channel controllers 101 or disk controllers 103 of the storage devices 30 and 40 search for a free entry in the local unreflected tables 501 and 601 that are stored in the shared memory 104 or the like, create a new entry, and write the write data to the block corresponding to the newly created entry.

Figure 12:
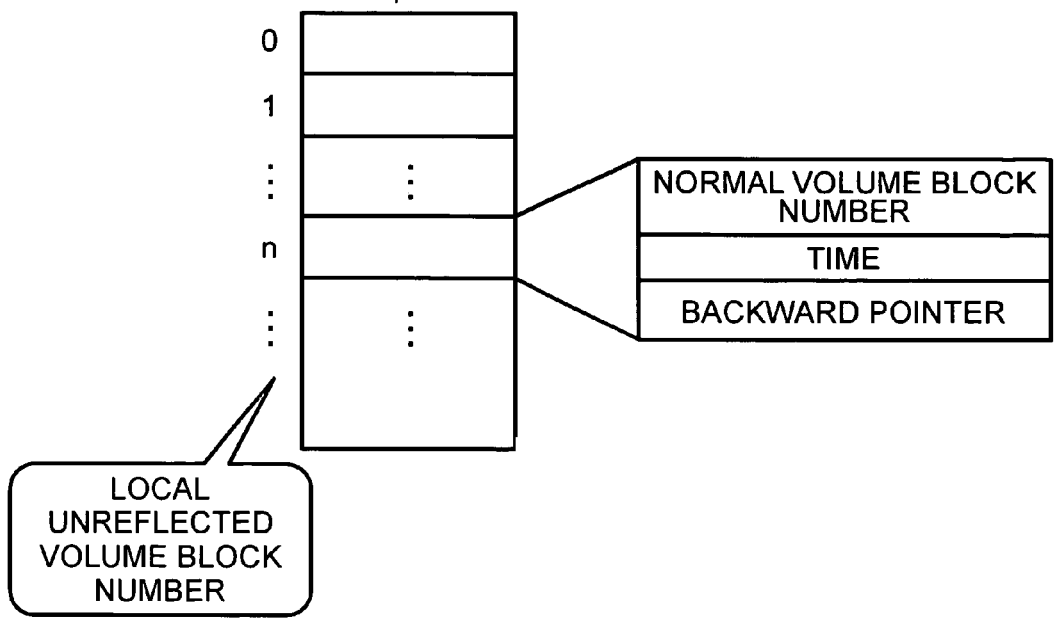
FIG. 12 is a diagram depicting an example of the local unreflected tables 501 and 601 pertaining to the embodiment of FIG. 11.

An example of the local unreflected tables 501 and 601 is depicted in FIG. 12. A normal volume block number column, time column, and backward pointer column are established for each entry in the local unreflected tables 501 and 601. And, the entry number is a corresponding block number of the local unreflected volume 511 or 611. The block number specified by the data write command transmitted from the information processing devices 10 and 20 is recorded in the normal volume block number column. Also, in an initial state, a "−1" indicative of an empty entry is recorded in the normal volume block number column. By providing this normal volume block number column, the channel controller 101 or disk controller 103 of the storage devices 30 and 40 can keep track of the block numbers of the normal volumes 510 and 610 under which the data stored in the block numbers of the local unreflected volumes 511 and 611 must be stored.

In the time column, the time (for example, year, month, day, hour, minute, second and millisecond) recorded in the header of the data write command transmitted from the information processing devices 10 and 20 is recorded. Also, this time may consist, for example, of the time at which the information processing devices 10 and 20 have created the data write request, or this time may consist of the time at which the information processing devices 10 and 20 have transmitted the data write request to the storage devices 30 and 40. This time is monitored by the timer 200 of the information processing devices 10 and 20, and it is recorded in the header of the data write command when this command is transmitted. Also, the channel controller 101 of the storage devices 30 and 40 may record, in the time column, the time at which the data write command was received from the information processing devices 10 and 20. Providing this time column enables the channel controller 101 of the storage devices 30 and 40 to administrate the write data received from the information processing devices 10 and 20 in chronological order.

The rear pointer column has the next entry number. In this way, valid entries of local unreflected table 501, 601 comprise a queue. In the queue, the entries are sorted based on "time" column values and the newest entry comes last. Putting a newly created entry in the queue is performed by comparing the "time" column of the new entry and the "time" columns of entries in the queue. The newly created entry is inserted in the position where all the entries, including the newly created one, are sorted in the order of "time."

If a newer entry than the newly created one is not found, a value "−1" is set to the rear pointer column of the newly created entry. Providing this rear pointer enables the disk controller 103 of the storage devices 30 and 40 to store the data stored in the local unreflected volumes 511 and 611 in order from oldest to newest in the normal volumes 510 and 610 before remote copying is executed, and to preserve the consistency of the data.

The remote unreflected volumes 512 and 612 consist of storage areas that contain data to be transmitted to the other storage devices 30 and 40 in order to make the contents of the normal volumes 510 and 610 of the storage devices 30 and 40 be the same.

When the storage devices 30 and 40 write to the normal volumes 510 and 610, or local unreflected volumes 511 and 611, the write data transmitted from the information processing devices 10 and 20, the storage devices 30 and 40 write the write data also to the remote unreflected volumes 512 and 612. The channel controller 101 of the storage devices 30 and 40 search for a free entry in the remote unreflected tables 502 and 602 stored in the shared memory 104 or the like, create a new entry, and write the write data to the block corresponding to the newly created entry. This updating may also be performed by means of the disk controller 103 of the storage devices 30 and 40.

Figure 13:
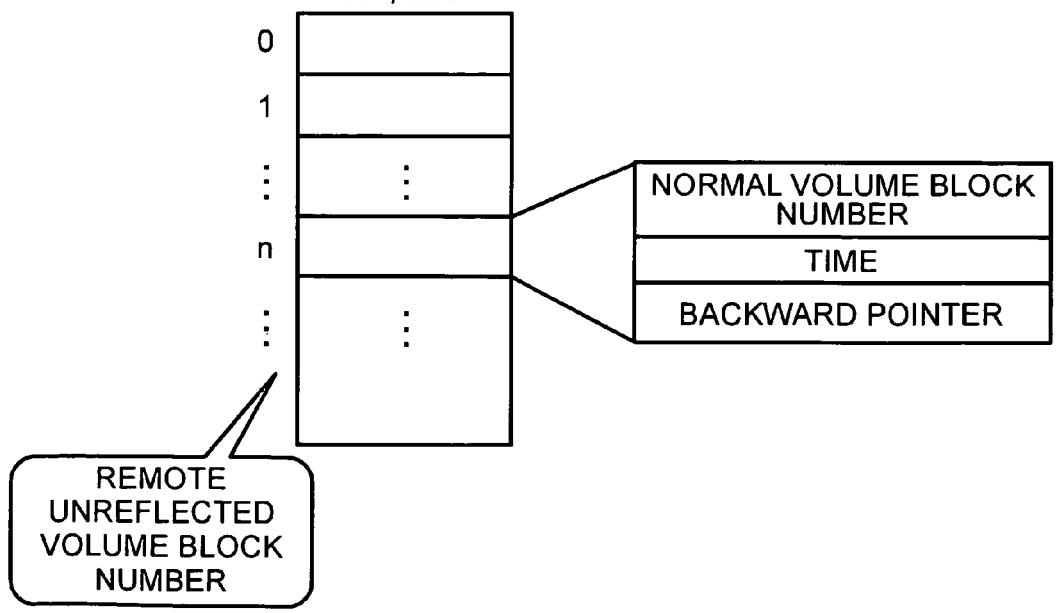
FIG. 13 is a diagram depicting an example of the remote unreflected tables 502 and 602 pertaining to the embodiment of FIG. 11.

FIG. 13 depicts an example of the remote unreflected tables 502 and 602. A normal volume block number column, time column, and backward pointer column are established for each entry of the remote unreflected tables 502 and 602, and the same contents are recorded in those columns as in the case of the local unreflected tables 501 and 601. And, the entry number is a corresponding block number of the remote unreflected volume 512 or 612. The channel controller 101 of the storage devices 30 and 40 can transmit to the other storage devices 30 and 40 the data stored in the remote unreflected volumes 512 and 612 in order from oldest to newest during remote copying by referring to the remote unreflected tables 502 and 602. Also, because the storage devices 30 and 40 are able to store the write data thus transmitted from oldest to newest in the normal volumes 510 and 610, the consistency of the data can be preserved.

By referring to the data location determination tables 500 and 600, it is possible to determine where the newest data is located. Prototypes of the data location determination tables 500 and 600 are created by the channel controller 101 of the storage devices 30 and 40 when it receives a transmission request from the other storage devices 30 and 40, and then it transmits the table to the other storage devices 30 and 40. The prototypes of the data location determination tables 500 and 600 are created based on the remote unreflected tables 502 and 602, and by reflecting the status of the local unreflected table 501, 601 to the prototype by the channel controller 101 in the storage device 30, 40 which received the prototype, the prototype becomes a full-fledged data location determination table 500 or 600, which can be used to determine where newest data can be found. Also, a request for transmission of the prototype of the data location determination tables 500 or 600 is issued, for example, when there is notice of failover or failback from the information processing devices 10 or 20 that access the storage devices 30 or 40.

FIG. 14 depicts an example of the data location determination tables 500 and 600. The way the data location determination table 500, 600 is created will be described here. First of all, the channel controller 101 in the storage device 30, 40 which received a request to send the prototype of the data location determination table 500, 600 initializes all of the columns of the prototype to "–1". Then, for each entry of the remote unreflected table 502, 602, if a block number is recorded in the normal volume block number column, the channel controller 101 of the storage devices 30 or 40 records in the prototype's column that corresponds to that block number the value recorded in the "time" column of the entry of the remote unreflected table 502, 602. After this, the channel controller 101 sends the prototype to the other storage device 30, 40 which issued the request of a prototype.

The channel controller 101 in the storage device 30, 40 which received the prototype executes the following procedures for each entry of the prototype:

(1) If the value stored in the entry is "–1", the controller looks up the local unreflected table 501, 601 to find "corresponding" entries. "Corresponding" here means that the entry number of the prototype and the value stored in the normal block number column of the local unreflected table 501, 601 are the same. If there is one or more corresponding entries, choose the newest entry among the corresponding entries and set the entry number to the prototype's entry.

(2) If the value stored in the entry is not "–1", the controller looks up the local unreflected table 501, 601 to find "corresponding" entries. "Corresponding" here has the same meaning as in (1). If there isn't a corresponding entry, the controller sets "–2" to the entry of the prototype. If there is one or more corresponding entries, the controller chooses the newest entry among the corresponding entries and compares the value stored in the "time" column of the newest entry and the value stored in the prototype's entry. If the value stored in the prototype is newer, the controller sets "–2" to the prototype's entry. If the value stored in the prototype isn't newer, the controller sets to the prototype's entry the aforementioned newest entry number.

In this way, the prototype becomes the full-fledged data location determination table 500 600.

Thus, based on the data location determination tables 500 and 600 that are created in this manner, the channel controller 101 of the storage devices 30 and 40 that received the prototype can keep track of which volume contains the newest target data of a data read request transmitted from the information processing devices 10 and 20.

Specifically, if "–1" is stored in the entry, the newest data is in the normal volume 510, 610. If "–2" is stored, the newest data is in the remote storage device 30, 40. If the other values are stored, the newest data is in the local unreflected volume 511, 611, and the value indicates the block number in it.

Also, in the present embodiment, when data corresponding to a data write request transmitted from the information processing devices 10 and 20 are written to the local unreflected volumes 511 and 611, the storage devices 30 and 40 that received the data location determination tables 500 and 600 record the local unreflected volume 511's or 611's block number, in which the data is written in the data location determination table 500's or 600's column that corresponds to the normal volume block number specified by the data write command. By this means, the channel controller 101 of the storage devices 30 and 40 can keep track of the volumes that contain the target data of the data read command transmitted from the information processing devices 10 and 20. Also, when the data location determination tables 500 or 600 is received, the storage devices 30 and 40 may be configured so as to store the tables in the shared memory 104, or they may be configured so as to store the tables in other storage areas (memory, volume, or the like).

Remote Copying

Figure 15:
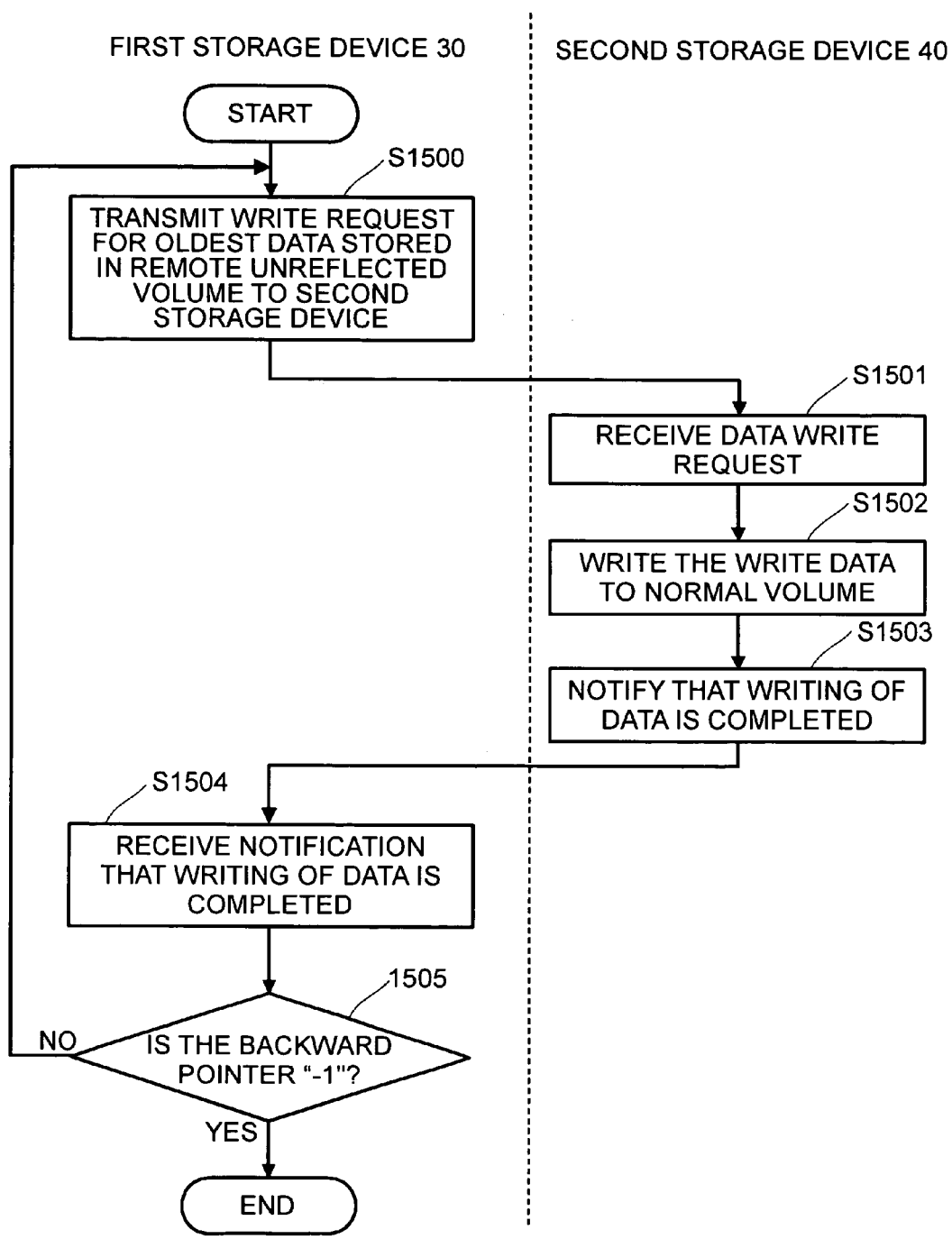
FIG. 15 is a flowchart depicting the remote copying performed in the background, representing an example of another embodiment.

FIG. 15 is a flowchart depicting the remote copying performed in the background, representing an example of another embodiment.

After notification of data write completion is transmitted to the first information processing device 10, the channel controller 101 of the first storage device 30 refers to the valid entries time column of the remote unreflected table 502 stored in the shared memory 104, creates a write request for the oldest data stored in the remote unreflected volume 512, and transmits the request to the second storage device 40 (S1500). Also, the block number recorded in the normal volume block number column of the remote unreflected table 502 is recorded as the target address of the data write command. At the same time, the value in the "time" column of the remote unreflected table 502 of the oldest data, a flag which indicates if there is at least one untransferred data to the remote storage device 40 ("the total remaining data flag" hereafter) and information which indicates if there is one or more untransferred data whose target address is the same as the one recorded in the data write command ("the remaining data information" hereafter) are transferred as a part of the write request. The total remaining data flag is either "1" (Yes) or "0" (No). The remaining data information is "0" (No data) if there is no remaining data. Or, the information is the "time" value of the newest untransferred data aimed at the target address if there is one or more remaining data. Both the total remaining data flag and the remaining data information can be created from the remote untransferred table 502.

The processing in steps (S1501) through (S1504) is then performed. Also, because the processing of the step (S1501) is performed in the same manner as in the step (S701), a description thereof is omitted.

Now, the step (S1502) will be described. The second storage device 40 writes the received data to free space in the local unreflected volume 611. The local unreflected table 601 is searched for an entry whose normal block number column value is "–1" to find the free space. Of course, the queue made up of valid entries of the local unreflected table 601 is looked up from the oldest entry and the newly created entry is inserted in the correct position so that all of the entries in the queue are in the order of time. Then, for every entry from the oldest to the newly created one in the queue, corresponding data in the local unreflected volume 611 is copied to the normal volume 610. When each copy is finished, the normal block number column of the entry in the local unreflected table 601 is reset to "−1". This means that the entry is invalidated. If the total data remaining flag is "0" (No), additional data reflection from the local unreflected volume 611 to the normal volume 610 is carried out for all of the entries in the queue from the oldest to the newest. Do not forget the entry invalidation after each copy.

For the remote copy data that was transferred from the first storage device 30, look up the queue of the local unreflected table 601 to find the newest entry and update the corresponding entry of the data location determination table 600 using the following procedure:
(1) If there is no unreflected data and the remaining data information is "0" (No data), set "−1" to the corresponding entry of data location determination table 600.
(2) If there is no unreflected data and the remaining data information is NOT "0", set "−2".
(3) If there is one or more unreflected data and the remaining data information is "0", set the entry number of the newest entry.
(4) If there is one or more unreflected data and the remaining data information is NOT "0", compare the "time" column of the newest entry and the remaining data information.
(4-1) If the remaining data information is newer, set "−2".
(4-2) If the remaining data information is older, set the number of the newest entry.

For each reflected data from the local unreflected volume 611 to the normal volume 610 after writing the remote copy data to the local unreflected volume 611, update the corresponding entry of the data location determination table 600 by using the following procedure:
(1) If the corresponding entry of the location determination table 600 is "−2", leave it as it is.
(2) Look up the local unreflected table 601 to find the corresponding entries and choose the newest one.
(3) If no corresponding entry is found, set "−1".
(4) If one or more corresponding entries are found, set the number of the newest entry.

If the storage device 40 does not have the data location determination table 600, the updates of the table described above are not performed.

Since the processing of the step (S1503) through (S1504) is performed in the same manner as in the step (S703) through (S704), a description thereof is omitted.

The channel controller 101 of the first storage device 30 then verifies the rear pointer column of the remote unreflected table 502 and determines whether or not the rear pointer is "−1" (S1505). When it is concluded that the rear pointer is not "−1" (S1505; NO), the process proceeds to step (S1500), and, based on the block number recorded in the rear pointer column of the remote unreflected volume 512, a write request for the data stored in that block (oldest data) is transmitted to the second storage device 40 (S1500). Alternatively, when it is concluded that the rear pointer is "−1" (S1505; YES), the channel controller 101 of the first storage device 30 concludes that there is no data not yet transferred to the second storage device 40, and the process is terminated.

After the determination in step (S1505) is performed, the channel controller 101 of the first storage device 30 updates the normal volume block number column of the target entry of the remote unreflected table 502 to "−1".

As described above, by means of processing whereby the first storage device 30 transmits to the second storage device 40 the data stored in the remote unreflected volume 512, and the second storage device 40 that received the data stores the aforementioned data in the normal volume 610 or in the local unreflected volume 611, and also data is reflected from the local unreflected volume 611 to the normal volume 610, the contents of the normal volumes 510 and 610 can be the same eventually (when remote copying between the storage devices 30, 40 is carried out and there is no remote copy pending data remaining in either storage device 30, 40).

Figure 8:
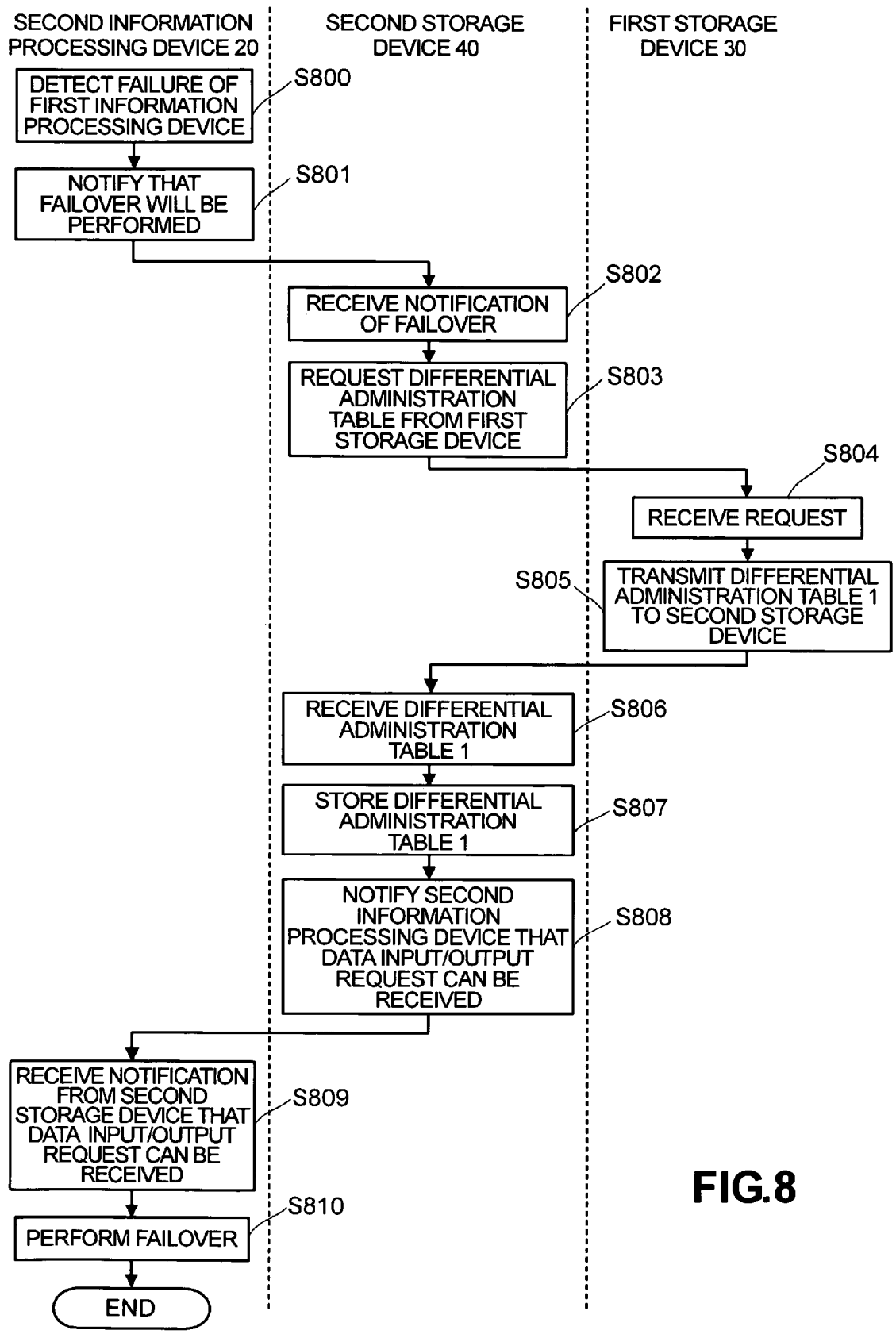
FIG. 8 is a flowchart depicting an example of the processing performed when the second information processing device 20 detects failure of the first information processing device 10, pertaining to the present invention.

Processing Performed when Failure Occurs in the First Information Processing Device When the second information processing device 20 detects a failure of the first information processing device 10, processing is performed in accordance with the flow of steps (S800) through (S810), as shown in FIG. 8.

Also, in step (S803), the channel controller 101 of the second storage device 40 requests the prototype of the data location determination table 500 from the first storage device 30.

In step (S805), the first storage device 30 creates a prototype of the data location determination table 500 on the basis of the remote unreflected table 502, as described above, and it transmits it to the second storage device 40. Then, the channel controller 101 in the second storage device 40 creates the data location determination table 600 based on the prototype.

Also, processing was described in the present embodiment for a case in which the second information processing device 20 detects a failure of the first information processing device 10, but processing is also performed in accordance with steps (S801) through (S810) in the case of failback. In the present embodiment, failover and failback can be performed repeatedly.

Processing performed when a data write request is received

An example of processing performed in a case in which the storage devices 30 and 40 receive a data write request from the information processing devices 10 and 20 after failover or failback will be described next with reference to FIG. 16.

When a data write request is received from the information processing devices 10 and 20 (S1600), the channel controller 101 of the storage devices 30 and 40 refers to the data location determination tables 500 and 600 and determines whether or not the value stored in the corresponding entry is other than "−1" (S1601). When it is concluded that the value is other than "−1" (S1601; YES), the process proceeds to step (S1603). Alternatively, when it is concluded that the value is "−1" (S1601; NO), the process proceeds to step (S1602).

In step (S1602), the channel controller 101 of the storage devices 30 and 40 stores a data write command in the shared memory 104 and stores the write data in the cache memory 105. Upon detecting that a data write command has been written to the shared memory 104, the disk controller 103 reads the write data from the cache memory 105 and writes the write data to the normal volumes 510 and 610 based on the block number specified by the data write command.

In step (S1603), as in step (S1602), the disk controller 103 of the storage devices 30 and 40 writes the write data to an open area of the local unreflected volumes 511 and 611. When the channel controller 101 receives notice of data write completion from the disk controller 103 thereafter, the channel controller 101 updates the contents of the local unreflected tables 501 and 601 (S1604). This updating is performed to the entry whose entry number is the same as the number of the block of the local unreflected volume 511, 611 to which the data was written. The address specified by the data write command is recorded in the normal volume block number column of the local unreflected tables 501 and 601. The time recorded in the header of the data write command is also recorded in the time column of the local unreflected tables 501 and 601. The channel controller 101 then updates the backward pointer column while referring to the time column of the local unreflected tables 501 and 601, so that the data stored in the local unreflected volumes 511 and 611 are stored in order from oldest to newest in the normal volumes 510 and 610.

Then, the channel controller 101 writes the entry number of the newly created entry of the local unreflected table 511, 611 in the corresponding column of the data location determination table 500, 600 to specify where the newest data is located.

In step (S1605), the disk controller 103 of the storage devices 30 and 40 writes, to the remote unreflected volumes 512 and 612, the data written in the normal volumes 510 and 610 or local unreflected volumes 511 and 611. When the channel controller 101 receives notice of data write completion from the disk controller 103 in the same manner as in step (S1604), the channel controller 101 then updates the contents of the remote unreflected tables 502 and 602 (S1606). The channel controller 101 of the storage devices 30 and 40 then notifies the information processing devices 10 and 20 that writing of data is completed (S1607), and the process is terminated.

Processing performed when a data read request is received

Figure 10:
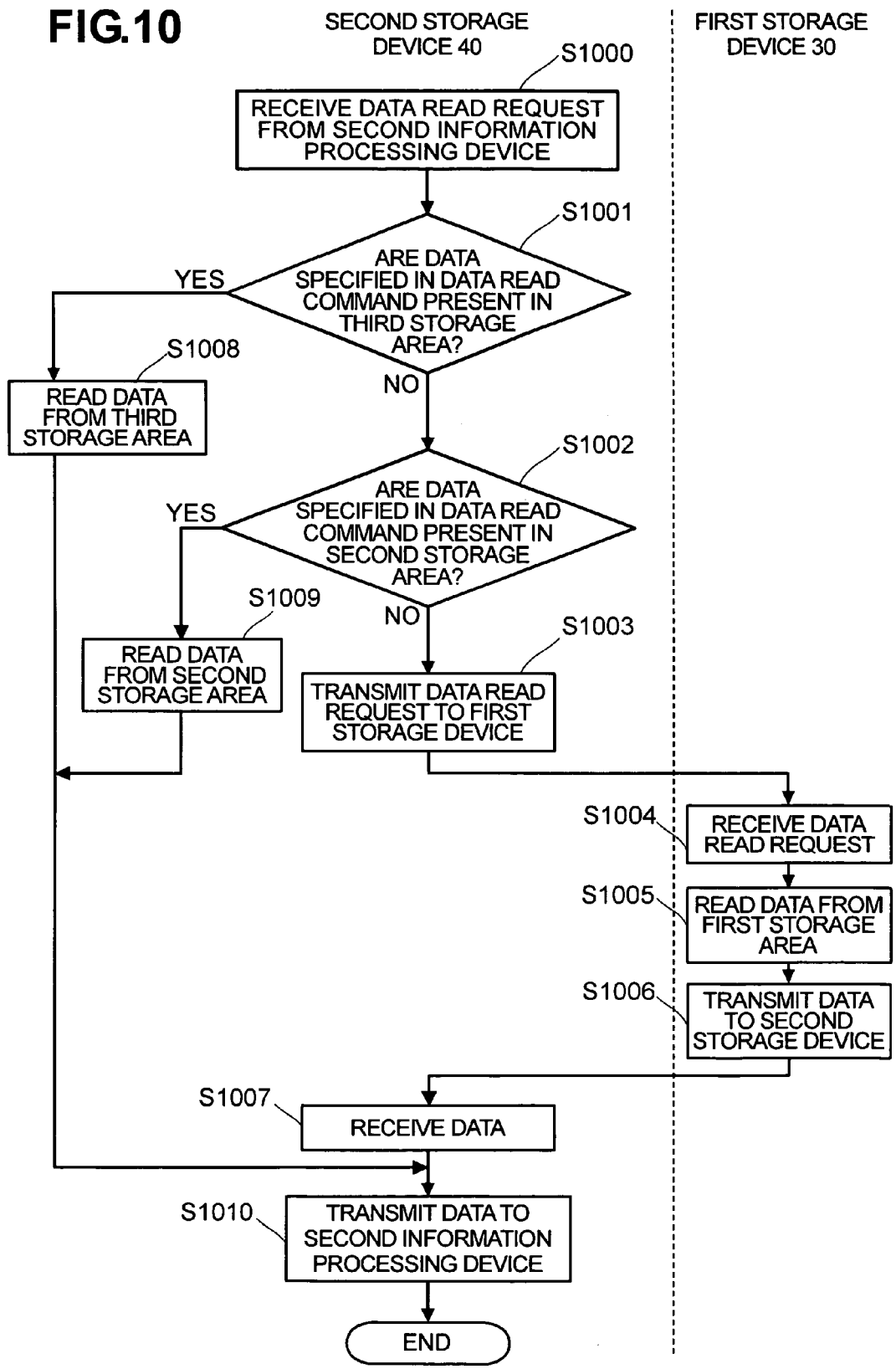
FIG. 10 is a flowchart depicting an example of processing performed when the second storage device 40 receives a data read request from the second information processing device 20 after failover in accordance with the present invention.

After failover or failback, the same processing as in steps (S1000) through (S1010), as shown in FIG. 10, is performed in a case in which the channel controller 101 of the storage devices 30 and 40 receives a data read request from the information processing devices 10 and 20.

Also, in step (S1001), the channel controller 101 of the storage devices 30 and 40 determines whether or not the newest data specified by the data read command received from the information processing devices 10 and 20 are present in the local unreflected volumes 511 and 611. In step (S1002), the channel controller 101 of the storage devices 30 and 40 also determines whether or not the newest data specified by the data read command is present in the normal volumes 510 and 610. These determinations are performed by referring to the value of columns that correspond to the normal volume block number of the data location determination tables 500 and 600, based on the address specified by the data read command.

When the block number of the local unreflected volumes 511 and 611 is recorded in the aforementioned column, the channel controller 101 of the storage devices 30 and 40 concludes that the newest data is present in the local unreflected volumes 511 and 611 (S1001; YES). When "−1" is recorded in the aforementioned column, the channel controller 101 of the storage devices 30 and 40 also concludes that the newest data is present in the normal volumes 510 and 610 (S1002; YES). Also, because the channel controller 101 of the storage devices 30 and 40 concludes that the newest data is present in the remote unreflected volumes 512 and 612 of the other storage devices 30 and 40 when "−2" is recorded in the aforementioned column, in step (S1005), the other storage devices 30 and 40 read, from the remote unreflected volumes 512 and 612, the newest target data of the data read request.

Various embodiments have been described, but the above-describes examples were given in order to aid in understanding the present invention and are not to be interpreted as limiting the present invention. The present invention may be modified or improved without deviating from the essence thereof, and its equivalents are also encompassed by the present invention.

What is claimed is:

1. A control method for a storage system comprising:
a first information processing device;
a second information processing device which is connected so as to be capable of communicating with the first information processing device, and which constitutes a cluster with the first information processing device;
a first storage device which is connected so as to be capable of communicating with the first information processing device, and performs writing/reading of data to a first storage area according to a data input/output request transmitted from the first information processing device; and
a second storage device which is connected so as to be capable of communicating with the second information processing device, and performs writing/reading of data to a second storage area according to a data input/output request transmitted from the second information processing device; wherein
the first storage device and the second storage device are connected so as to be capable of communicating with each other;
the second storage device, during a first processing in which the first storage device transmits to the second storage device a replication of the data written to the first storage area, and the second storage device that received the data writes the data to the second storage area, requests first information from the first storage device indicating that a replication of the data written in the first storage area has not yet been transmitted to the second storage device and that the replication of the data has not been written to the second storage area when notice of failover is received from the second information processing device;
the second storage device notifies the second information processing device that a data input/output request can be received when the first information is received from the first storage device; and
the second storage device refers the first information upon receipt of a data read request transmitted from the second information processing device in which failover has occurred, requests the target data of the data read request from the first storage device when it is concluded that the target data of the data read request are stored in the first storage area, and transmits to the second information processing device the target data of the data read request transmitted from the first storage device as per the request.

2. The control method for a storage system according to claim 1, wherein
the second storage device comprises a third storage area;
when a data write request is received from the second information processing device during execution of the first processing, the second storage device writes the target data of the data write request to the third storage area;
when the first processing is completed, the second storage device writes a replication of the data written in the third storage area to the second storage area; and
the second storage device transmits write data consisting of data written in the third storage area to the first storage device, and initiates a second processing consisting of processing whereby the first storage device that received the write data writes the write data to the first storage area.

3. The control method for a storage system according to claim 1, wherein
the second storage device comprises a third storage area;
when the data write request is received from the second information processing device during execution of the first processing, the second storage device writes the target data of the data write request to the third storage area;
when the data read-request is received from the second information processing device, the second storage device determines whether or not the target data of the data read request are stored in the third storage area;
when it is concluded that the target data of the data read request are not stored in the third storage area, the second storage device refers the first information and determines whether or not the target data of the data read request are stored in the second storage area; and
when it is concluded that the target data of the data read request are not stored in the second storage area, the second storage device requests the target data of the data read request from the first storage device, and when the target data of the data read request transmitted from the first storage device as per the request are received, the second storage device transmits the target data of the data read request to the second information processing device.

4. The control method for a storage system according to claim 1, wherein
the second storage device comprises a third storage area;
when a data write request is received from the second information processing device during execution of the first processing, the second storage device writes the target data of the data write request to the third storage area;
when notice of failback is received from the first information processing device during execution of the first processing, the first storage device requests second information from the second storage device indicating that the data written in the third storage area has not yet been transmitted to the first storage device, and that the data has not been written to the first storage area;
when the second information is received from the second storage device, the first storage device notifies the first information processing device that a data input/output request can be received; and
the second storage device refers the second information when a data read request transmitted from the first information processing device in which failback has occurred is received, requests the target data of the data read request from the second storage device when it is concluded that the target data of the data read request are stored in the third storage area, and transmits to the first information processing device the target data of the data read request transmitted from the second storage device as per the request.

5. The control method for a storage system according to claim 4, wherein
the first storage device comprises a fourth storage area;
when a data write request is received from the first information processing device during execution of the first processing, the second storage device writes the target data of the data write request to the fourth storage area;
when the first processing is completed, the second storage device writes a replication of the data written in the third storage area to the second storage area;
the second storage device transmits write data consisting of data written in the third storage area to the first storage device, and initiates a second processing consisting of processing whereby the first storage device that received the write data writes the write data to the first storage area;
when the second processing is completed, the first storage device writes a replication of the data written in the fourth storage area to the first storage area; and
the first storage device transmits write data consisting of data written in the fourth storage area to the second storage device, and initiates a third processing consisting of processing whereby the second storage device that received the write data writes the write data to the second storage area.

6. The control method for a storage system according to claim 4, wherein
the first storage device comprises a fourth storage area;
when a data write request is received from the first information processing device during execution of the first processing, the first storage device writes the target data of the data write request to the fourth storage area;
when a data read request is received from the first information processing device, the first storage device determines whether or not the target data of the data read request are stored in the fourth storage area;
when it is concluded that the target data of the data read request are not stored in the fourth storage area, the first storage device refers the second information and determines whether or not the target data of the data read request are stored in the third storage area; and
when it is concluded that the target data of the data read request are stored in the third storage area, the first storage device requests the data from the second storage device, and when the target data of the data read request transmitted from the second storage device as per the request are received, the first storage device transmits the target data of the data read request to the first information processing device.

7. The control method for a storage system according to claim 1, wherein
the first information processing device monitors time at which the data write request is transmitted to the first storage device;
the first information processing device transmits the transmission time information together with the data write request to the first storage device;
the first storage device associates and administrates the target data of the data write request transmitted sequentially from the first information processing device with the transmission time information, respectively; and
the first storage device transmits the data stored in the first storage area to the second storage device in order from oldest to newest.

8. A storage system comprising:
a first information processing device;
a second information processing device which is connected so as to be capable of communicating with the first information processing device, and which constitutes a cluster with the first information processing device;
a first storage device which is connected so as to be capable of communicating with the first information processing device, and performs writing/reading of data to a first storage area according to a data input/output request transmitted from the first information processing device; and a second storage device which is connected so as to be capable of communicating with the second information processing device, and performs writing/reading of data to a second storage area according to a data input/output request transmitted from the second information processing device; wherein the first storage device and the second storage device are connected so as to be capable of communicating with each other;

the storage system comprises a replication processor for executing a first processing that consists of processing whereby the first storage device transmits to the second storage device a replication of the data written to the first storage area, and the second storage device that received the data writes the data to the second storage area;

the second storage device comprises a channel controller;

when notice of failover is received from the second information processing device during execution of the first processing, the channel controller requests first information from the first storage device indicating that the replication of the data written in the first storage area has not yet been transmitted to the second storage device, and that a replication of the data has not been written to the second storage area;

when the first information is received from the first storage device, the channel controller notifies the second information processing device that a data input/output request can be received; and the channel controller refers the first information when a data read request transmitted from the second information processing device in which failover has occurred is received, requests the target data of the data read request from the first storage device when it is concluded that the target data of the data read request are stored in the first storage area, and transmits to the second information processing device the target data of the data read request transmitted from the first storage device as per the request.

9. The storage system according to claim 8, wherein the second storage device comprises a third storage area and a disk controller;

the channel controller receives a data write request from the second information processing device during execution of the first processing;

the disk controller writes the target data of the data write request to the third storage area;

when the first processing is completed, the disk controller writes a replication of the data written in the third storage area to the second storage area; and the replication processor transmits the data written by the second storage device in the third storage area to the first storage device, and initiates a second processing consisting of processing whereby the first storage device that received the data writes the data to the first storage area.

10. The storage system according to claim 8, wherein the second storage device comprises a third storage area and a disk controller;

the channel controller receives a data write request from the second information processing device during execution of the first processing;

the disk controller writes the target data of the data write request to the third storage area;

the channel controller receives a data read request from the second information processing device;

the channel controller determines whether or not the target data of the data read request are stored in the third storage area;

when it is concluded that the target data of the data read request are not stored in the third storage area, the channel controller refers the first information and determines whether or not the target data of the data read request are stored in the second storage area; and when it is concluded that the target data of the data read request are not stored in the second storage area, the channel controller requests the target data of the data read request from the first storage device, and transmits the target data of the data read request to the second information processing device upon receipt of the target data of the data read request transmitted from the first storage device as per the request.

11. The storage system according to claim 8, wherein the second storage device comprises a third storage area and a disk controller;

the first storage device comprises a channel controller;

the channel controller of the second storage device receives a data write request from the second information processing device during execution of the first processing;

the disk controller writes the target data of the data write request to the third storage area;

when notice of failback is received from the first information processing device during execution of the first processing, the channel controller of the first storage device requests second information from the second storage device indicating that the data written in the third storage area has not yet been transmitted to the first storage device, and that the data has not been written to the first storage area;

when the second information is received from the second storage device, the channel controller of the first storage device notifies the first information processing device that a data input/output request can be received; and the channel controller of the first storage device refers the second information when a data read request transmitted from the first information processing device in which failback has occurred is received, requests the target data of the data read request from the second storage device when it is concluded that the target data of the data read request are stored in the third storage area, and transmits to the first information processing device the target data of the data read request transmitted from the second storage-device as per the request.

12. The storage system according to claim 11, wherein the first storage device comprises a fourth storage area and a disk controller;

the channel controller of the first storage device receives a data write request from the first information processing device during execution of the first processing;

the disk controller of the first storage device writes the target data of the data write request to the fourth storage area;

when the first processing is completed, the disk controller of the second storage device writes a replication of the data written in the third storage area to the second storage area;

the replication processor transmits the data written by the second storage device in the third storage area to the first storage device, and initiates a second processing consisting of processing whereby the first storage device that received the data writes the data to the first storage area;

the disk controller of the first storage device writes the data received from the second storage device and written in the third storage area to the first storage area;

when the second processing is completed, the disk controller of the first storage device writes a replication of the data written in the fourth storage area to the first storage area; and the replication processor transmits the data written by the first storage device in the fourth storage area to the second storage device, and initiates a third processing consisting of processing whereby the second storage device that received the data writes the data to the second storage area.

13. The storage system according to claim 11, wherein the first storage device comprises a fourth storage area and a disk controller;

the channel controller of the first storage device receives a data write request from the first information processing device during execution of the first processing;

the disk controller of the first storage device writes the target data of the data write request to the fourth storage area;

the channel controller of the first storage device receives a data read request from the first information processing device;

the channel controller of the first storage device determines whether or not the target data of the data read request are stored in the fourth storage area;

when it is concluded that the target data of the data read request are not stored in the fourth storage area, the channel controller of the first storage device refers the second information and determines whether or not the target data of the data read request are stored in the third storage area; and when it is concluded that the target data of the data read request are stored in the second storage area, the channel controller of the first storage device requests the target data of the data read request from the second storage device, receives the target data of the data read request transmitted from the second storage device as per the request, and transmits the target data of the data read request to the first information processing device.

14. The storage system according to claim 8, wherein the first information processing device comprises:

a timer for monitoring time at which the data write request is transmitted to the first storage device; and a processor for transmitting the data write request to the first storage device and transmitting the transmission time information; and the first storage device comprises:

the channel controller for associating and administrating the target data of the data write request transmitted sequentially from the first information processing device with the transmission time information, respectively; and the channel controller for transmitting the data stored in the first storage area to the second storage device in order from oldest to newest.

15. A storage device for a storage system that comprises:
a first information processing device;
a second information processing device which is connected so as to be capable of communicating with the first information processing device, and which constitutes a cluster with the first information processing device;

another storage device which is connected so as to be capable of communicating with the first information processing device, and performs writing/reading of data to a first storage area according to a data input/output request transmitted from the first information processing device; and a storage device which is connected so as to be capable of communicating with the second information processing device, and performs writing/reading of data to a second storage area according to a data input/output request transmitted from the second information processing device; wherein the other storage device and the storage device are connected so as to be capable of communicating with each other; and the storage system comprises a replication processor for executing a first processing that consists of processing whereby the other storage device transmits to the storage device a replication of the data written to the first storage area, and the storage device that received the data writes the data to the second storage area; and wherein the storage device comprises a channel controller;

when notice of failover is received from the second information processing device during executing of the first processing, the channel controller requests first information from the other storage device indicating that a replication of the data written in the first storage area has not yet been transmitted to the storage device, and that a replication of the data has not been written to the second storage area;

when the first information is received from the other storage device, the channel controller notifies the second information processing device that a data input/output request can be received; and the channel controller refers the first information when a data read request transmitted from the second information processing device in which failover has occurred is received, requests the target data of the data read request from the other storage device when it is concluded that the target data of the data read request are stored in the first storage area, and transmits to the second information processing device the target data of the data read request transmitted from the other storage device as per the request.

16. The storage device according to claim 15, comprising a third storage area and a disk controller; wherein the channel controller receives a data write request from the second information processing device during execution of the first processing;

the disk controller writes the target data of the data write request to the third storage area;

when the first processing is completed, the disk controller writes a replication of the data written in the third storage area to the second storage area; and the channel controller transmits the data written in the third storage area to the other storage device.

17. The storage device according to claim 15, comprising:
a third storage area and a disk controller; wherein
the channel controller receives a data write request from the second information processing device during execution of the first processing;

the disk controller writes the target data of the data write request to the third storage area;

the channel controller receives a data read request from the second information processing device;

the channel controller determines whether or not the target data of the data read request are stored in the third storage area;

when it is concluded that the target data of the data read request are not stored in the third storage area, the channel controller refers the first information and determines whether or not the target data of the data read request are stored in the second storage area; and when it is concluded that the target data of the data read request are not stored in the second storage area, the channel controller requests the target data of the data read request from the other storage device, and transmits the target data of the data read request to the second information processing device upon receipt of the target data of the data read request transmitted from the other storage device as per the request.

18. A storage device for a storage system that comprises:

a first information processing device;

a second information processing device which is connected so as to be capable of communicating with the first information processing device, and which constitutes a cluster with the first information processing device;

a storage device which is connected so as to be capable of communicating with the first information processing device, and performs writing/reading of data to a first storage area according to a data input/output request transmitted from the first information processing device; and another storage device which is connected so as to be capable of communicating with the second information processing device, and performs writing/reading of data to a second storage area according to a data input/output request transmitted from the second information processing device; wherein the storage device and other storage device are connected so as to be capable of communicating with each other; and the storage system comprises a replication processor for executing a first processing that consists of processing whereby the storage device transmits to the other storage device a replication of the data written to the first storage area, and the other storage device that received the data writes the data to the second storage area;

the other storage device comprises a third storage area; and the other storage device receives a data write request from the second information processing device during execution of the first processing and writes the target data of the data write request to the third storage area; and wherein the storage device comprises a channel controller;

when notice of failback is received from the first information processing device during execution of the first processing, the channel controller requests second information from the other storage device indicating that the data written in the third storage area has not yet been transmitted to the storage device, and that the data has not been written to the first storage area;

when the second information is received from the other storage device, the channel controller notifies the first information processing device that a data input/output request can be received; and the channel controller refers the second information when a data read request transmitted from the first information processing device in which failback has occurred is received, requests the target data of the data read request from the other storage device when it is concluded that the target data of the data read request are stored in the third storage area, and transmits to the first information processing device the target data of the data read request transmitted from the second information processing device as per the request.

19. The storage system according to claim 18, wherein the storage device comprises a fourth storage area and a disk controller;

the channel controller receives a data write request from the first information processing device during execution of the first processing;

the disk controller writes the target data of the data write request to the fourth storage area;

the channel controller receives the data written in the third storage area transmitted from the other storage device;

the disk controller writes the data written in the third storage area to the first storage area;

when all the data written in the third storage area are written, the disk controller writes a replication of the data written in the fourth storage area to the first storage area; and the channel controller transmits the data written in the fourth storage area to the other storage device.

20. The storage system according to claim 18, wherein the storage device comprises a fourth storage area and a disk controller;

the channel controller receives a data write request from the first information processing device during execution of the first processing;

the disk controller writes the target data of the data write request to the fourth storage area;

the channel controller receives a data read request from the first information processing device;

the channel controller determines whether or not the target data of the data read request are stored in the fourth storage area;

when it is concluded that the target data of the data read request are not stored in the fourth storage area, the channel controller refers the second information and determines whether or not the target data of the data read request are stored in the third storage area; and when it is concluded that the target data of the data read request are stored in the second storage area, the channel controller requests the target data of the data read request from the other storage device, receives the target data of the data read request transmitted from the other storage device as per the request, and transmits the target data of the data read request to the first information processing device.

* * * * *